United States Patent
Mori et al.

(10) Patent No.: US 9,197,830 B2
(45) Date of Patent: Nov. 24, 2015

(54) SOLID-STATE IMAGING DEVICE AND DRIVING METHOD OF SOLID-STATE IMAGING DEVICE

(71) Applicant: PANASONIC CORPORATION, Osaka (JP)

(72) Inventors: Mitsuyoshi Mori, Kyoto (JP); Yusuke Sakata, Osaka (JP); Yutaka Hirose, Kyoto (JP); Ryohei Miyagawa, Kyoto (JP); Hiroyuki Doi, Toyama (JP); Masafumi Tsutsui, Toyama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/167,746

(22) Filed: Jan. 29, 2014

(65) Prior Publication Data
US 2014/0146211 A1 May 29, 2014

Related U.S. Application Data

(63) Continuation of application No. PCT/JP2012/004840, filed on Jul. 30, 2012.

(30) Foreign Application Priority Data

Aug. 8, 2011 (JP) .................................. 2011-172635
Aug. 24, 2011 (JP) .................................. 2011-183136

(51) Int. Cl.
*H04N 3/14* (2006.01)
*H04N 5/335* (2011.01)
(Continued)

(52) U.S. Cl.
CPC ............ *H04N 5/3742* (2013.01); *H04N 5/3575* (2013.01); *H04N 5/363* (2013.01); *H04N 5/374* (2013.01); *H04N 5/3745* (2013.01)

(58) Field of Classification Search
CPC . H04N 5/232; H04N 5/23219; H04N 5/3742; H04N 5/363; H04N 5/3575; H04N 5/374; H04N 5/3745; H01L 27/14609; H01L 27/14656

USPC ......... 348/294–324; 250/208.1; 257/290–292
See application file for complete search history.

(56) References Cited

U.S. PATENT DOCUMENTS 7,217,983 B2 5/2007 Suzuki
7,280,144 B2 10/2007 Kakumoto et al.
(Continued)

FOREIGN PATENT DOCUMENTS

JP 2002-262186 A 9/2002
JP 2004-349907 A 12/2004
(Continued)

OTHER PUBLICATIONS

International Search Report issued in International Application No. PCT/JP2012/004840 mailed Oct. 16, 2012, 11 pgs.

*Primary Examiner* — Yogesh Aggarwal
(74) *Attorney, Agent, or Firm* — McDermott Will & Emery LLP

(57) ABSTRACT

A solid-state imaging device includes: an epilayer; pixel electrodes; a photoelectric converting film formed above the pixel electrodes and converting incident light into electric signals; a transparent electrode formed on the photoelectric converting film; charge accumulating regions of an n-type each (i) formed in the epilayer to correspond to one of the pixel electrodes, (ii) electrically connected to the one corresponding pixel electrode, and (iii) accumulating signal charges generated by the photoelectric converting film through the photo-electrically conversion; charge barrier regions of a p-type each formed in the epilayer to contact a bottom of a corresponding one of the charge accumulating regions; and charge draining regions of an n-type each formed in the epilayer to contact a bottom of a corresponding one of the charge barrier regions.

12 Claims, 15 Drawing Sheets

(51) Int. Cl.
*H04N 5/374* (2011.01)
*H04N 5/357* (2011.01)
*H04N 5/363* (2011.01)
*H04N 5/3745* (2011.01)

(56) References Cited

U.S. PATENT DOCUMENTS

| | | | |
|---|---|---|---|
| 7,498,624 | B2 | 3/2009 | Suzuki |
| 8,390,036 | B2 | 3/2013 | Goto |
| 2004/0233304 | A1 | 11/2004 | Kakumoto et al. |
| 2005/0205901 | A1* | 9/2005 | Suzuki .......................... 257/291 |
| 2008/0083925 | A1 | 4/2008 | Suzuki |
| 2011/0049665 | A1 | 3/2011 | Goto |
| 2012/0200752 | A1 | 8/2012 | Matsunaga |

FOREIGN PATENT DOCUMENTS

| | | |
|---|---|---|
| JP | 2005-268479 A | 9/2005 |
| JP | 2006-120922 | 5/2006 |
| JP | 2007-103786 A | 4/2007 |
| JP | 2007-207891 A | 8/2007 |
| JP | 4444371 B1 | 3/2010 |
| JP | 2010-200328 A | 9/2010 |
| WO | 2011/058684 A1 | 5/2011 |

* cited by examiner

SOLID-STATE IMAGING DEVICE AND DRIVING METHOD OF SOLID-STATE IMAGING DEVICE

CROSS REFERENCE TO RELATED APPLICATIONS

This is a continuation application of PCT Patent Application No. PCT/JP2012/004840 filed on Jul. 30, 2012, designating the United States of America, which is based on and claims priority of Japanese Patent Applications No. 2011-183136 filed on Aug. 24, 2011 and No. 2011-172635 filed on Aug. 8, 2011. The entire disclosures of the above-identified applications, including the specifications, drawings and claims are incorporated herein by reference in their entirety.

FIELD

The present disclosure relates to a stacked solid-state imaging device having unit pixels arranged in an array, and a method for driving the stacked solid-state imaging device.

BACKGROUND

Complementary Metal Oxide Semiconductor (CMOS) area image sensors and Metal Oxide Semiconductor (MOS) area image sensors (both hereinafter referred to as MOS sensor), as well as Charge Coupled Devices area image sensors (hereinafter referred to as CCD sensor), generate image signals based on an amount of charges created depending on the intensity of incident light coming to the sensors. As functional devices, these image sensors (solid-state imaging devices) are included in various kinds of imaging appliances such as digital still cameras, digital camcorders, IP cameras, and cell-phone cameras.

A conventional image sensor has pixel units (unit pixels) arranged in a two-dimensional array near the surface of a semiconductor substrate, the pixel units each including a photoelectric converting unit (photo diode) and a readout circuit unit. The opening area of the photoelectric converting unit reduces depending on the area of the reading circuit unit. Hence, the conventional image sensor is problematic in that the aperture ratio of the photoelectric converting unit drops with the decreasing size of the pixel unit.

In contrast, Patent Literature 1 cites a stacked image sensor including a readout circuit unit provided near the surface of the semiconductor substrate, and a photoelectric converting film made of a material which allows photoelectric conversion and stacked above the solid-state imaging device.

The photoelectric converting unit for a stacked image sensor in PTL 1 includes a photoelectric converting film provided between electrodes. The photoelectric converting film generates charges from light signals, and the generated charges are transferred to a readout circuit via the electrodes. FIG. 15 depicts the structure of a pixel unit in PTL 1. In the pixel unit of FIG. 15, the charges generated in a photoelectric converting film 101 are accumulated through a pixel electrode 102 in a charge accumulating unit 103 which is a p-n junction and formed on the substrate. The charge accumulating unit 103 is connected to the gate of an amplifying transistor 104. The pixel unit outputs a voltage variation due to a fluctuation in the amount of the accumulated charges. The charge accumulating unit 103 is further connected to the drain of a reset transistor 106 in order to reset the charges in the charge accumulating unit 103 after the charges are read out of the photoelectric converting film 101. When the reset transistor 106 turns on, the voltage of the charge accumulating unit 103 is set to an initial voltage.

CITATION LIST

Patent Literature

[PTL 1]
Japanese Patent No. 4444371

SUMMARY

Technical Problem

The inventors of the present disclosure have discovered a disadvantage of the stacked image sensor that employs the pixel unit structure and the readout technique shown in PTL 1: The stacked image sensor suffers from a reduction in signal output especially in imaging under high lighting intensity, and a similar signal-output reduction in imaging after the imaging under high lighting intensity.

One non-limiting and embodiment provides a highly-reliable stacked solid-state imaging device which is capable of reducing degradation in characteristics of a reset transistor and an amplifying transistor after capturing an object having high brightness.

Solution to Problem

One non-limiting and embodiment provides a solid-state imaging device. The solid-state imaging device includes: a semiconductor substrate; and unit pixels disposed on the semiconductor substrate, wherein each of the unit pixels includes:

a first electrode; a photoelectric converting film disposed on the first electrode and converting light into an electric signal; a second electrode disposed on the photoelectric converting film; a charge accumulating region of first conductivity, the charge accumulating region being electrically connected to the first electrode, and the charge accumulating region accumulating charges generated by the photoelectric converting film through photo-electrical conversion; a charge barrier region of second conductivity disposed in contact with a bottom of the charge accumulating region, the second conductivity being electrically opposite the first conductivity; and a charge draining region of the first conductivity disposed in contact with a bottom of the charge barrier region.

Advantageous Effects

A solid-state imaging device according to the present disclosure is a highly-reliable stacked solid-state imaging device which is free from damages to a readout circuit in a unit pixel even in capturing an object having high brightness.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENTS

Underlying Knowledge Forming Basis of the Present Disclosure

In relation to the solid-state imaging device described in the Background Art section, the inventors have found the problems below.

Figure 15:
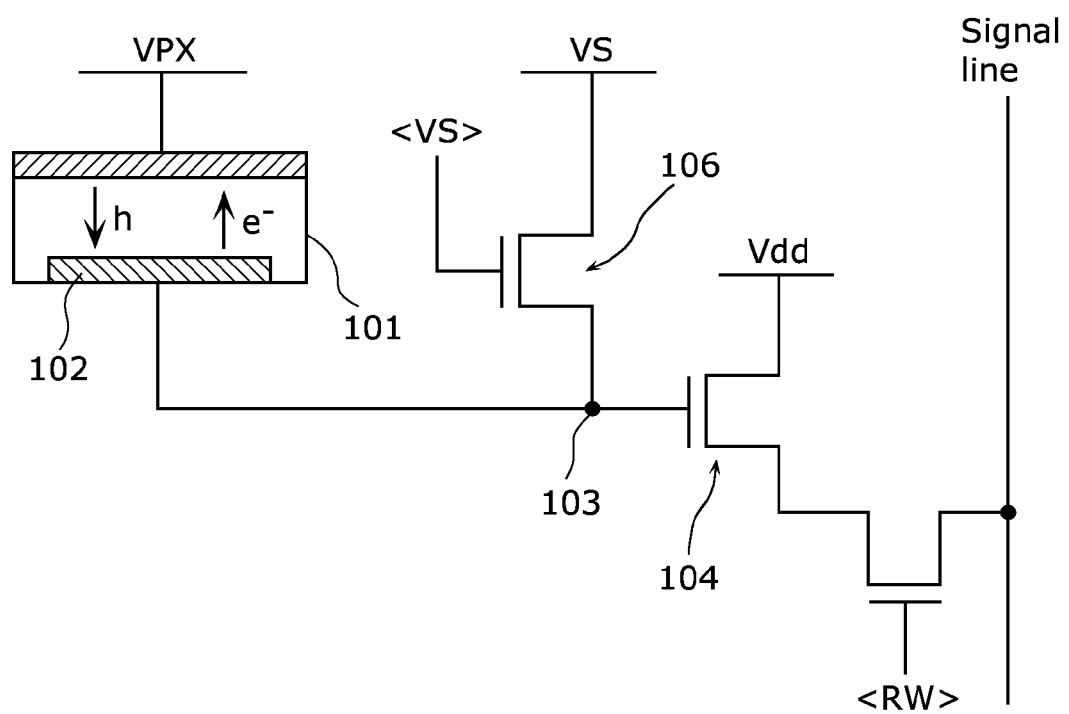
FIG. 15 is a cross-sectional view showing a structure of a conventional pixel unit.

In the stacked image sensor illustrated in FIG. 15, the charge accumulating unit 103 and the gate electrode of the amplifying transistor 104 are electrically connected together. A typical gate oxide of the amplifying transistor 104 is an ultra thin film of several nanometers to several dozen nanometers in thickness. Hence, the gate oxide could be damaged if an excessively-high gate voltage is applied thereon. In capturing an object having high brightness, however, the potential of the charge accumulating unit 103 increases to the voltage applied to a counter electrode provided on the photoelectric converting film 101. Here, a high electric field over the breakdown voltage is applied to the gate oxide of the amplifying transistor 104. Such a high electric field damages the gate oxide of the amplifying transistor 104, causing serious deterioration in sub threshold characteristics and reducing signal output from the pixel unit.

Furthermore, in capturing an object having high brightness, the charge accumulating unit 103—that is the source of the reset transistor—has a high voltage. Hence when the reset transistor 106 turns on and off in a reset operation, charges are injected into a channel of the reset transistor 106. The injected charges then gain kinetic energy in the channel due to the source-drain voltage difference, and become hot carriers. The hot carriers develop impact ionization, creating a large amount of electron-hole pairs. The impact ionization creates a large amount of electrons to be injected into the gate oxide of the reset transistor 106, resulting in deterioration in switching characteristics of the reset transistor 106. The degradation in characteristics progresses to be irreversible, causing a decrease in the level of an output signal from the pixel unit.

One non-limiting and embodiment provides a solid-state imaging device. The solid-state imaging device includes: a semiconductor substrate; and unit pixels disposed on the semiconductor substrate, wherein each of the unit pixels includes:

a first electrode; a photoelectric converting film disposed on the first electrode and converting light into an electric signal; a second electrode disposed on the photoelectric converting film; a charge accumulating region of first conductivity, the charge accumulating region being electrically connected to the first electrode, the charge accumulating region accumulating charges generated by the photoelectric converting film through photo-electrical conversion; a charge barrier region of second conductivity disposed in contact with a bottom of the charge accumulating region, the second conductivity being electrically opposite the first conductivity; and a charge draining region of the first conductivity disposed in contact with a bottom of the charge barrier region.

The signal charges from the photoelectric converting film increase the potential of the charge accumulating unit. When the potential rises higher than or equal to a certain level, the charges in the accumulating unit flow into the charge draining region. This keeps the potential of the charge draining region from rising to the certain level or higher. Such features contribute to reducing damages to an amplifying transistor and a reset transistor and curbing a decrease in the level of an output signal from a unit pixel in capturing an object having high brightness.

The charge barrier region may be lower in impurity concentration than the charge draining region.

The feature facilitates the flow of the charges into the charge draining region when the charges are accumulated and the potential of the charge accumulating region increases, which contributes to preventing an increase in the potential of the charge accumulating region to a high level.

The solid-state imaging device may further include a metal-oxide-semiconductor (MOS) transistor initializing a potential of the charge accumulating region, wherein each charge accumulating region may also work as one of a drain region and a source region of the MOS transistor, an other one of the drain region and the source region of the MOS transistor may be of the first conductivity, and from a top surface of the semiconductor substrate, the charge accumulating region may be formed deeper than the other one of the drain region and the source region is.

The features facilitate the flow of the charges into the charge draining region as well as set aside, in the semiconductor substrate, a well region for a readout circuit outputting a signal corresponding to the charges in a unit pixel.

The charge draining region may contact the semiconductor substrate of the second conductivity.

The feature makes it possible to fix the potential of a separating region via the semiconductor substrate without the influence of the charge draining region, which contributes to stable operation of a readout circuit provided in a region separated by the separating region.

A potential of the charge draining region may vary.

The feature makes the potential of the charge draining region adjustable depending on the potential of the charge accumulating region, and the adjustable potential of the charge accumulating region varies depending on brightness. This contributes to reduction in power consumption.

One non-limiting and embodiment provides a solid-state imaging device. The solid-state imaging device includes: a first electrode formed above the substrate; a photoelectric converting film formed above the first electrode and converting light into signal charges; a second electrode formed on the photoelectric converting film; a charge accumulating unit formed on the substrate, electrically connected to the first electrode, and accumulates charges flowing from the first electrode; a reset transistor having a drain electrically connected to the charge accumulating unit; a signal readout circuit electrically connected to the charge accumulating unit, and generating a readout signal which is an electric signal and whose level is based on an amount of the charges accumulated in the charge accumulating unit; and a control circuit (i) applying a turn-on voltage to a gate of the reset transistor while applying a first voltage to a source of the reset transistor, and (ii) varying a voltage being applied to the source from the first voltage to a second voltage while applying the turn-on voltage to the gate, the turn-on voltage turning on the gate of the reset transistor, the first voltage repelling the charges accumulated in the charge accumulating unit, and the second voltage attracting the charges accumulated in the charge accumulating unit.

Thanks to such features, the solid-state imaging device according to the present disclosure can previously drop a high drain-source voltage of a reset transistor in a reset operation of each pixel when capturing an object having high brightness, and can turn on the gate of the reset transistor after the drop. Hence, unlike a typical case where the gate of the reset transistor turns on while the drain-source voltage is still high, the hot carriers become significantly low in numbers and generation of excessive charges are curbed. Hence, the features prevent a fluctuation in output level and degradation in characteristics of reset transistors and keep from a dark dot and image sticking.

While the gate of the reset transistor is on in the solid-state imaging device according to the present disclosure, the control circuit gradually may vary the voltage being applied to the source from the first voltage to the second voltage, so that a time period for the gradual variation takes longer than or equal to a time period required for a pulse to the gate to either rise or fall.

The features keep the drain-source voltage of a reset transistor low before the gate of the reset transistor turns on, which contributes to the prevention of channel hot carriers and the resulting impact ionization that appear as soon as the gate of the reset transistor turns on. Then, with a decrease in source potential, the signal charges accumulated in the charge accumulating unit are neutralized by charges injected from the source of the reset transistor. In addition, a gradual decrease, not a sudden drop, in the voltage being applied to the source makes it possible to set the charge accumulating unit to the initial state in which remaining charges are drained, while the source-drain voltage of the reset transistor is kept low.

The solid-state imaging device according to the present disclosure may further include a comparator comparing the readout signal with a first reference level, wherein if the comparator determines that the level of the readout signal is lower than or equal to the first reference level, the control circuit may stop the variation in the voltage being applied to the source and apply the turn-on voltage to the gate while keeping the voltage being applied to the source fixed to the second voltage.

If the light from an object having high brightness is relatively weak and the impact ionization is not likely to occur, the features make it possible to reduce power consumption for changing the level of a reset voltage. This contributes to lowering the power consumption of the solid-state imaging device.

In the solid-state imaging device according to the present disclosure, the comparator may further compare the readout signal with a second reference level which is higher than the first reference level, and if the comparator determines that the level of the readout signal is higher than the second reference level, the control circuit may (i) apply the turn-on voltage to the gate while applying the first voltage to the source, (ii) vary the voltage being applied to the source from the first voltage to the second voltage while applying the turn-on voltage to the gate, and (iii) continuously apply the turn-on voltage to the gate after the variation.

The features keep the gate of the reset transistor on to suspend the imaging operation and provide sufficient protection to a reset transistor, if the object is excessively bright and continual imaging would never fail to cause image sticking.

In the solid-state imaging device according to the present disclosure, the first electrode may be formed electrically separated into sub first electrodes, the sub first electrodes may each correspond to one of (i) charge accumulating units including the charge accumulating unit, (ii) reset transistors including the reset transistor, (iii) signal readout circuits including the signal readout circuit, (iv) control circuits including the control circuit, and (v) comparators including the comparator, and one of the control circuits may cause another one of the control circuits to continuously apply the turn-on voltage to a gate of one of the reset transistors corresponding to the other control circuit, if one of the comparators corresponding to the one control circuit determines that a level of a readout signal for the one comparator is higher than the second reference level.

The features provide sufficient protection to a reset transistor for another pixel, if the object is excessively bright and continual imaging would never fail to cause image sticking.

In the solid-state imaging device according to the present disclosure, the charge accumulating unit may accumulate holes as the charges, and the control circuit may (i) turn on the gate of the reset transistor while applying a positive voltage as the first voltage to the source of the reset transistor, and (ii) decrease a voltage being applied to the source of the reset transistor from the first voltage to the second voltage while leaving the gate of the reset transistor on, the second voltage being lower than the first voltage.

This feature allows the control circuit to execute a suitable operation when the charges to be accumulated in the charge accumulating unit are holes.

In the solid-state imaging device according to the present disclosure, the charge accumulating unit may accumulate electrons as the charges, and the control circuit may (i) turn on the gate of the reset transistor while applying a negative voltage as the first voltage to the source of the reset transistor, and (ii) increase a voltage being applied to the source of the reset transistor from the first voltage to the second voltage while leaving the gate of the reset transistor on, the second voltage being higher than the first voltage.

This feature allows the control circuit to operate circuit to execute a suitable operation when the charges to be accumulated in the charge accumulating unit are electrons.

It is noted that the overall and specific aspects may be implemented in the form of a system, a method, an integrated circuit, a computer program, or a recording medium, or any given combination thereof.

The present disclosure may be implemented in the form of a control method executed by a control circuit of the solid-state imaging device, a large-scale integration (LSI) implementing a part or all of the functions of the solid-state imaging device, and an imaging apparatus (camera) including the solid-state imaging device.

Described hereinafter are embodiments with reference to the drawings. It is noted that the present disclosure shall not be limited to the embodiments below. The embodiments may be subject to modification unless otherwise departing from the advantages of the present disclosure. The constituent elements, arrangement positions of and connecting schemes between the constituent elements, timing points, and the order of the timing points are examples, and shall not limit the present disclosure. Hence, among the constituent elements in the embodiments, those not described in an independent claim representing the most generic concept of the present disclosure are introduced as arbitrary ones. In the drawings, the same reference signs are provided to elements representing materially the same structure, operation, and effect.

Embodiment 1

Figure 1:
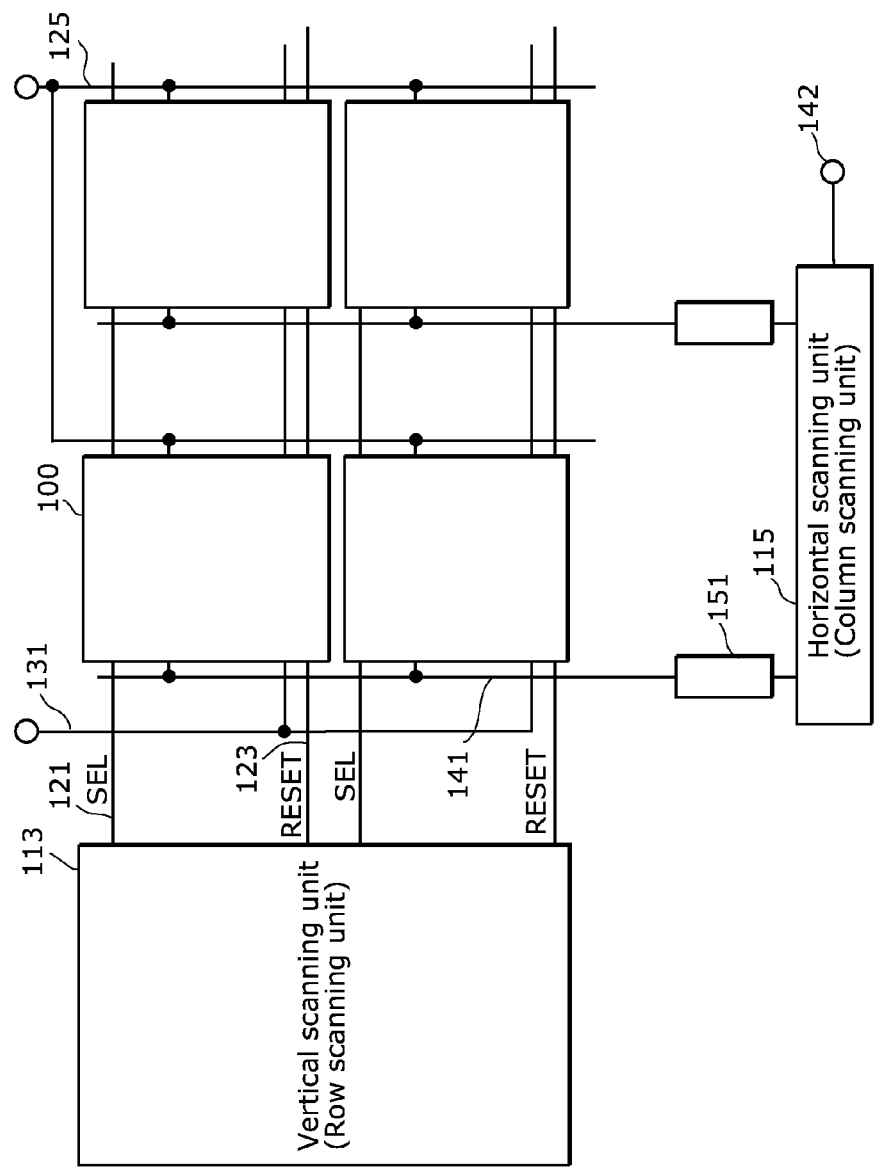
FIG. 1 depicts a drawing exemplifying a schematic structure of a solid-state imaging device according to Embodiment 1.
Figure 2:
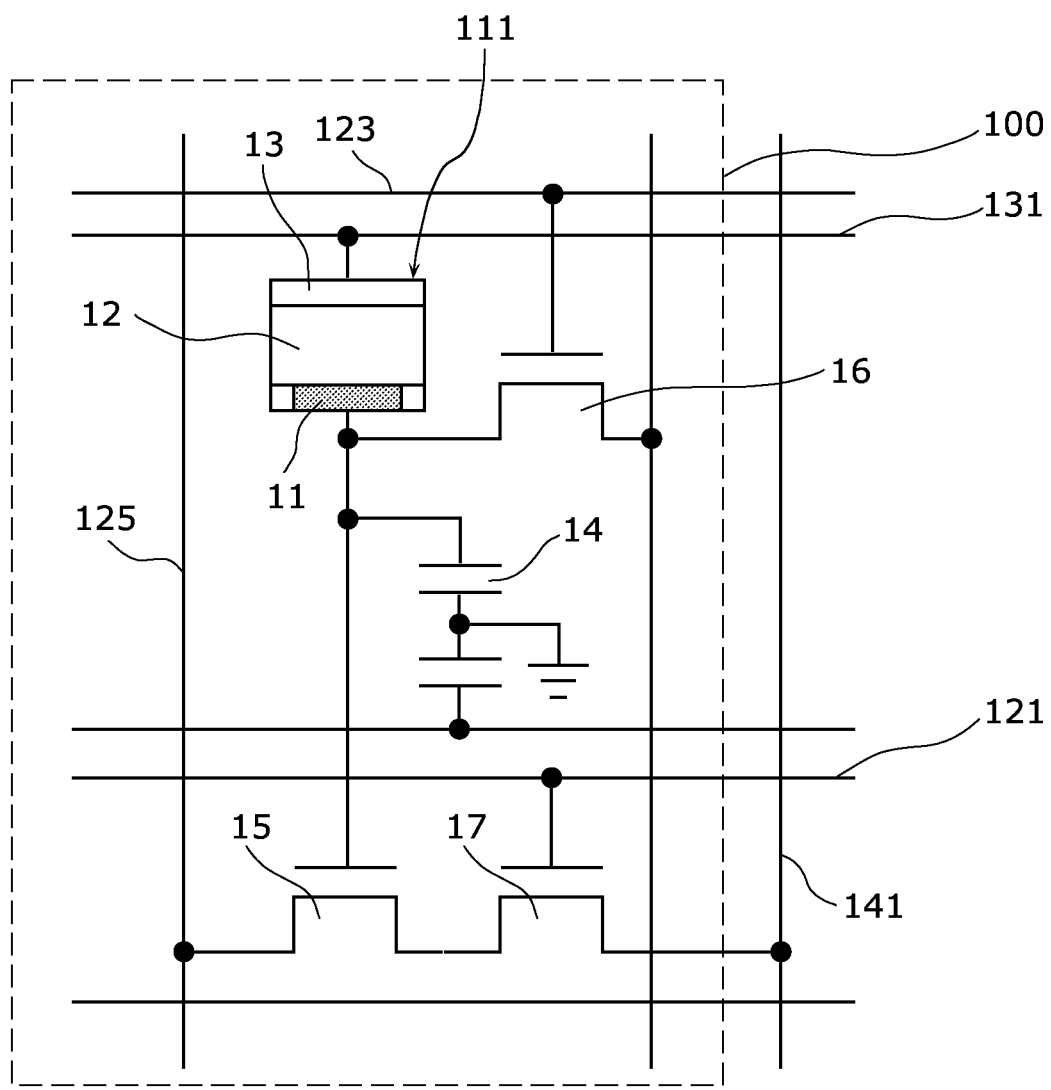
FIG. 2 depicts a circuit diagram exemplifying a structure of a unit pixel according to Embodiment 1.

FIG. 1 depicts a drawing exemplifying a schematic structure of a solid-state imaging device according to Embodiment 1. FIG. 2 depicts a circuit diagram exemplifying a structure of a unit pixel 100 illustrated in FIG. 1. FIG. 1 shows only "two-by-two" unit pixels 100; however, the unit pixels 100 may be arranged in any given numbers of rows and columns.

The solid-state imaging device includes: a semiconductor substrate (not shown) including silicone, unit pixels 100 arranged above the substrate in a matrix (two-dimensionally arranged), a vertical scanning unit (also referred to as row scanning unit) 113 for supplying various timing signals to the unit pixels 100, a horizontal scanning unit (also referred to as column scanning unit or horizontal signal readout unit) 115 for sequentially reading out signals from the unit pixels 100 and sending to a horizontal output terminal 142, column signal lines (vertical signal lines) 141 each provided to a corresponding one of the columns of the unit pixels 100, and a column signal processing unit 151 for processing the signals outputted to the column signal line 141.

As shown in FIG. 2, each of the unit pixels 100 includes: a photoelectric converting unit 111 for photoelectrically converting incident light to generate signal charges; an amplifying transistor 15 having a gate connected to the photoelectric converting unit 111; a reset transistor 16 having a drain connected to the photoelectric converting unit 111; a selecting transistor 17 connected in series to the amplifying transistor 15; and a charge accumulating region (floating diffusion) 14 working as an accumulating diode connected to the photoelectric converting unit 111 to accumulate the signal charges from the photoelectric converting unit 111.

The photoelectric converting unit 111 includes: a photoelectric converting film 12 formed above the semiconductor substrate between a pixel electrode 11 and a transparent electrode 13, and including an organic material and amorphous silicon which photoelectrically convert incident light; the pixel electrode (first electrode) 11 formed below the photoelectric converting film 12—that is the bottom surface of the photoelectric converting film 12 and facing the semiconductor substrate—, and working as a lower electrode; and a transparent electrode (second electrode) 13 formed above the photoelectric converting film 12—that is the top surface of the photoelectric converting film 12 and opposite the pixel electrode 11—, provided over multiple pixel units 11 including the pixel unit 11, and working as an upper electrode. The pixel electrode 11 includes metal. The transparent electrode 13 includes a transparent material such as ITO or ZnO to allow incident light to enter the photoelectric converting film 12.

The amplifying transistor 15, the reset transistor 16, and the selecting transistor 17, each of which is a MOS transistor, are provided in the semiconductor substrate, and form a readout circuit for outputting a signal voltage corresponding to the signal charges from the photoelectric converting unit 111.

The photoelectric converting unit 111 is provided between (i) the gate of the amplifying transistor 15 and the drain of the reset transistor 16 and (ii) a photoelectric converting unit control line 131. The amplifying transistor 15 has the gate connected to the pixel electrode 11 and outputs a signal voltage, generated based on the potential of the pixel electrode 11, to the column signal line 141 via the selecting transistor 17. The reset transistor 16 has the drain connected to the pixel electrode 11 and the source connected to a resetting potential, and initializes the potential of the charge accumulating region 14. The selecting transistor 17 has the gate connected to the vertical scanning unit 113 via an address control line 121. The reset transistor 16 has the gate connected to the vertical scanning unit 113 via a reset control line 123. The address control line 121 and the reset control line 121 are provided for each row of the unit pixels 100. The amplifying transistor 15 has the drain connected to a power line 125 and the source connected to the column signal line 141 via the selecting transistor 17. The selecting transistor 17 and the reset transistor 16 are turned on and off by the vertical scanning unit 113 via a row reset signal RESET and a row selection signal SEL.

It is noted that, in Embodiment 1, the reset transistor 16 is an n-type MOS transistor. A reset signal sent to the gate of the reset transistor 16 includes a reset pulse of positive (rising pulse), and the trailing edge of the reset pulse is falling.

The photoelectric converting unit control line 131 is common for all the unit pixels 100. The column signal line 141 is provided for each column of the unit pixels 100, and connected to a horizontal signal readout unit 115 via the column signal processing unit 151. The column signal processing unit 151 performs processing on a noise cancelling signal, such as correlated double sampling and analog-to-digital conversion.

In a unit pixel 100 structured above, the signal charges generated by the photoelectric converting unit 111 are transferred to the charge accumulating region 14 via the pixel electrode 11. In Embodiment 1, a positive bias is applied to the transparent electrode 13 via the photoelectric converting unit control line 131 in order to transfer the signal charges. The signal charges transferred to the charge accumulating region 14 are amplified by the amplifying transistor 15. The amplified signal charges are outputted to the column signal line 141 when the selecting transistor 17 turns on.

Figure 3:
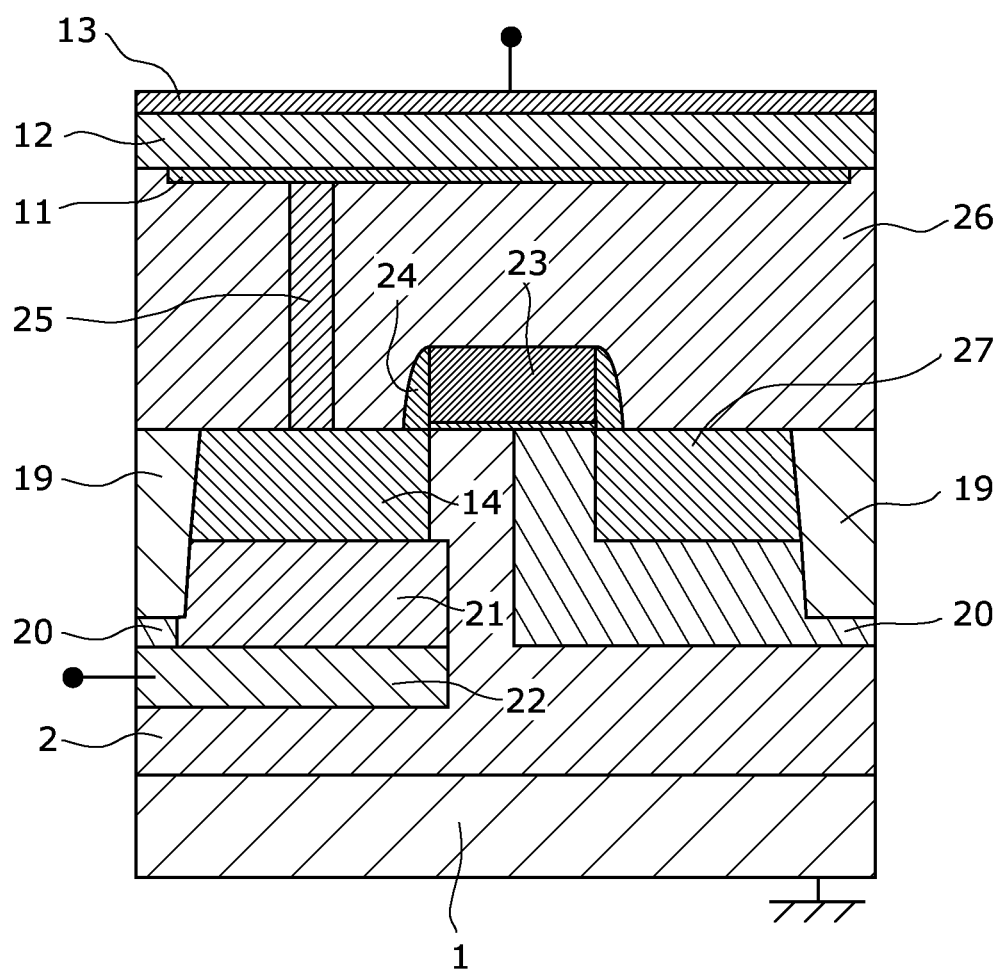
FIG. 3 depicts a cross-sectional view exemplifying a structure of the solid-state imaging device according to Embodiment 1.

Described next is an example showing a cross-section of the charge accumulating region 14 for a unit pixel 100 included in the solid-state imaging device according to Embodiment 1. FIG. 3 depicts a cross-sectional view exemplifying a structure of the solid-state imaging device (cross-sectional view exemplifying a structure of the unit pixel 100) according to Embodiment 1.

The solid-state imaging device includes a semiconductor substrate 1 containing p-type impurities of a high concentration; an epilayer (epitaxial layer) 2 including p-type impurities of a low concentration; the pixel electrodes 11 arranged above the epilayer 2 in an array and each included in a different unit pixel 100, the photoelectric converting film 12 formed above the pixel electrode 11 and converts (photoelectrically converts) incident light into electric signals to generate signal charges; the transparent electrode 13 formed on the photoelectric converting film 12; the charge accumulating regions 14 of the n-type (first conductivity) each (i) formed in the epilayer 2 to correspond to one of the pixel electrodes 11, (ii) electrically connected to the one corresponding pixel electrode 11, and (iii) accumulating the signal charges generated by the photoelectric converting film 12 through the photoelectrical conversion; charge barrier regions 21 of the p-type (second conductivity) each formed in the epilayer 2 to contact a bottom of a corresponding one of the charge accumulating regions 14, the p-type being electrically opposite the n-type; and charge draining regions 22 of the n-type each formed in the epilayer 2 to contact a bottom of a corresponding one of the charge barrier regions 21.

The charge barrier regions 21 are lower in impurity concentration than the charge draining regions 22. The charge draining region 22 contacts the p-type epilayer 2. It is noted that the solid-state imaging device includes, aside from a separating region 20, shallow trench isolation (STI) 19 for electrically separating the neighboring charge accumulating regions 14.

The solid-state imaging device includes a reset transistor 16 for initializing a potential of the charge accumulating region 14. The charge accumulating region 14 also works as a drain region of the reset transistor 16. A source region 27 of the reset transistor 16 is the n-type.

The unit pixel 100 includes: the semiconductor substrate 1; the epilayer 2; the pixel electrode 11, the photoelectric converting film 12, the transparent electrode 13; the charge accumulating region 14; the separating region 20; the charge barrier region 21; the charge draining region 22; a gate electrode 23, a side wall 24; a contact wire 25; an insulating layer 26; and the source region 27. The gate electrode 23 and the side wall 24 working as a side wall of the gate electrode 23 are provided in the epilayer 2, and form the reset transistor 16 together with the charge accumulating region 14 and the source region 27 both provided in the epilayer 2. The contact wire 25 is formed in the insulating layer 26 and electrically connects the pixel electrode 11 with charge accumulating region 14.

When a positive voltage is applied to the transparent electrode 13 in unit pixel 100, the signal charges (holes) generated by the photoelectric converting film 12 are transferred to and accumulated in the charge accumulating region 14 via the pixel electrode 11. The charge accumulating region 14 also works as a drain region of the reset transistor 16. When the reset transistor 16 turns on, the potential of the charge accumulating region 14 is initialized (reset). The charge accumulating region 14 is electrically separated from another unit pixel 100 by the separating region 20. In order to reduce the sheet resistance of the separating region 20 forming a well region, the charge draining regions 22 are provided in an imaging region (the region of the epilayer 2 where the unit pixels 100 are arranged in an array) and formed in an array or in stripes, contacts the epilayer 2, and connects the imaging region with the epilayer 2. The charge draining region 22 receives an appropriate voltage depending on the potential of the charge accumulating region 14. The potential of the charge draining region 22 varies depending on the potential of the charge accumulating region 14.

As to the semiconductor substrate 1, the charge barrier region 21 is positioned deeper than the charge accumulating region 14 is, and the charge draining region 22 is positioned deeper than the charge barrier region 21 is. The separating region 20 is positioned deeper than the charge accumulating region 14 is and shallower than the charge draining region 22 is.

In the unit pixel 100, the potential of the charge accumulating region 14 increases in proportion to signal charges generated when light enters the charge accumulating region 14 accumulating in the charge accumulating region 14. Here, the charge accumulating region 14 also works as the drain region of the reset transistor 16. When the potential of the charge accumulating region 14 reaches a breakdown voltage (approximately 10 V), the reset transistor 16 could be damaged. Here, a high voltage is also applied to the gate of an amplifying transistor (not shown) electrically connected to the charge accumulating region 14. When the potential of the charge accumulating region 14 reaches a breakdown voltage (2 V to 10 V) of the gate oxide for the amplifying transistor, the amplifying transistor could be damaged. However, formed under the charge accumulating region 14 is the charge barrier region 21 whose impurity concentration is lower than that of the charge draining region 22. The charge draining region 22 is formed under the charge barrier region 21. Here, a voltage (3V or lower) is applied to the charge draining region 22, and holes to be accumulated drain into the charge draining region 22 when the potential of the charge accumulating region 14 increases. Such a feature curbs an increase in the potential of the charge accumulating region 14, which contributes to controlling the potential of the charge accumulating region 14 not to exceed a breakdown voltage of the gate oxides for the reset transistor 16 and the amplifying transistor.

Figure 4:
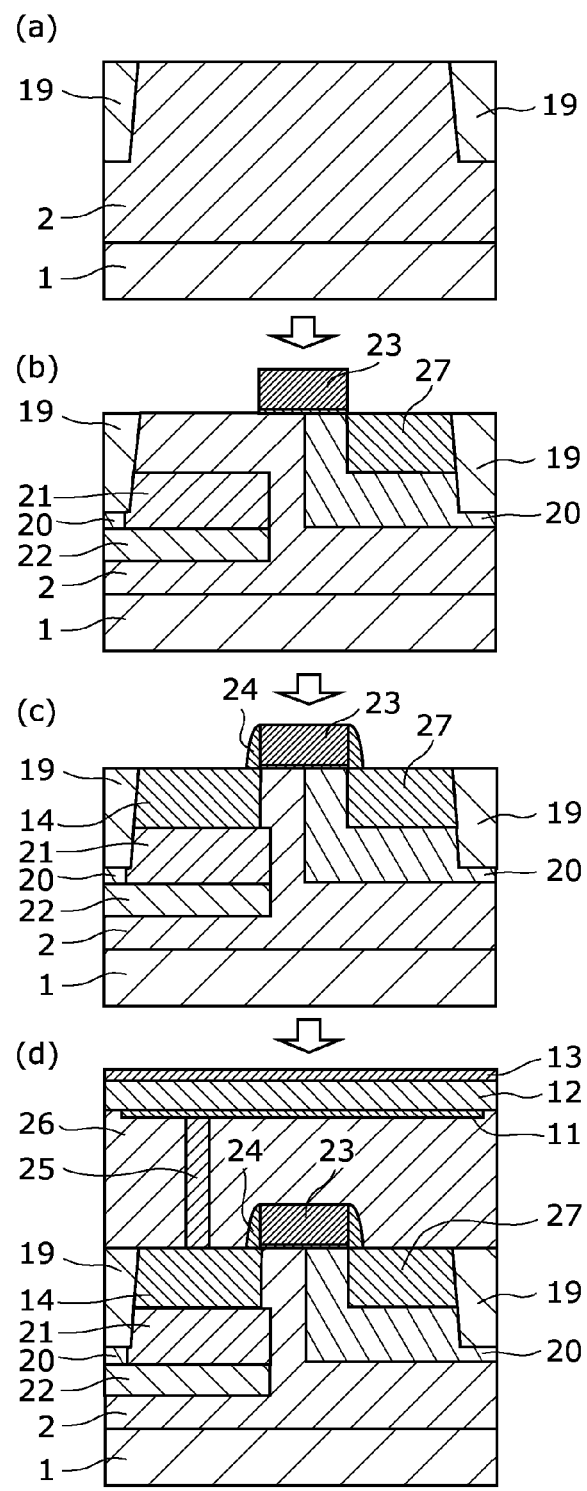
FIG. 4 depicts a cross-sectional view exemplifying a manufacturing process of the solid-state imaging device according to Embodiment 1.

Described next is how to manufacture the solid-state imaging device according to Embodiment 1, with reference to FIG. 4. FIG. 4 depicts a cross-sectional view exemplifying a manufacturing process of the solid-state imaging device according to Embodiment 1.

First, as the illustration (a) in FIG. 4 shows, a typical solid-state imaging device manufacturing method is employed to form the STI 19 that electrically separates multiple transistors for each unit pixel 100. The STI 19 is formed in the epilayer 2 of a low concentration (for example, $10^{16}$ cm$^{-3}$ to $10^{17}$ cm$^{-3}$) provided above the p-type semiconductor substrate 1 of a high concentration (for example, $10^{18}$ cm$^{-3}$ to $10^{20}$ cm$^{-3}$).

As shown in the illustration (b) in FIG. 4, the epilayer 2 is patterned by lithography to have an opening in a desired region. Using ion implantation with the pattern, the charge draining region 22 and the charge barrier region 21 are formed. The separating region 20 is formed by a technique similar to the above ones to electrically separate the source region and the drain region of each transistor for each unit pixel 100. Then, a typical solid-state imaging device manufacturing method is employed to form in the epilayer 2 the gate oxide and the gate electrode 23 for each of the transistors in the unit pixel 100.

Here, the charge draining region 22 is formed by infusion of phosphorus atoms or arsenic atoms acting as n-type impurities forming an n-type layer. The injected n-type impurities for the charge draining region 22 have a concentration of, for example, $10^{16}$ cm$^{-3}$ to $10^{18}$ cm$^{-3}$, and the depth between the top surface of the epilayer 2 and the bottom surface of the charge draining region 22 is, for example, approximately 0.3 µm to 1.5 µm. The charge draining region 22 is continuously formed in an array or in stripes until the ends of the imaging region. Hence, the charge draining region 22 can get a voltage from the outside of the imaging region. This feature eliminates the need of a region for the voltage application in the unit pixel 100 and makes it easy to manufacture the unit pixel 100 smaller in size.

Furthermore, the potential of the separating region 20 for partitioning the well region of a transistor in the unit pixel 100 can be fixed via the semiconductor substrate 1. This feature contributes to reducing the sheet resistance of the well region to one third or lower and to driving the transistors in the unit pixel 100 faster.

The injected ions for the separating region 20 have a concentration of, for example, $10^{16}$ cm$^{-3}$ to $10^{19}$ cm$^{-3}$, and the depth between the top surface of the epilayer 2 and the bottom surface of the separating region 20 is, for example, approximately 1.5 µm.

The charge barrier region 21 is provided between the charge draining region 22 and the charge accumulating region 14. When the potential of the charge accumulating region 14 is low—that is approximately between 0 V to 3 V—, the charge barrier region 21 electrically separates the charge draining region 22 from the charge accumulating region 14. When the potential of the charge accumulating region 14 is approximately 3V or higher, the charge barrier region 21 drains the charges in the charge accumulating region 14 into the charge draining region 22. Used in Embodiment 1 are the reset transistor 16 and an amplifying transistor both having a breakdown voltage of approximately 3 V. The limit of a breakdown voltage for the transistor can be adjusted by a voltage applied to the charge draining region 22 and the impurity concentration of the charge barrier region 21. The injected ions for the charge barrier region 21 have a concentration of, for example, $10^{15}$ cm$^{-3}$ to $10^{18}$ cm$^{-3}$, and the depth between the top surface of the epilayer 2 and the bottom surface of the charge barrier region 21 is, for example, approximately 0.1 µm to 1.3 µm.

Then, as the illustration (c) in FIG. 4 shows, the side wall 24 and the charge accumulating region 14 are formed. The charge accumulating region 14 is underlaid across the side wall 24 while an end (the end that corresponds to the gate electrode 23 when the semiconductor substrate 1 is seen from the top) of the charge accumulating region 14 is approximately aligned with the side wall 24 formed on the side surface of the gate electrode 23. The charge accumulating region 14 also works as the drain region of the reset transistor 16. Thus, the profile of impurities and the position of the charge accumulating region 14 below the gate electrode 23 are designed so that the potential can be initialized.

In forming the charge accumulating region 14, the epilayer 2 is patterned by lithography to have an opening in a desired region, and ion implantation with the pattern is used. The injected ions for the charge accumulating region 14 have a concentration of, for example, $10^{16}$ cm$^{-3}$ to $10^{20}$ cm$^{-3}$, and the depth between the top surface of the epilayer 2 and the bottom surface of the charge accumulating region 14 is, for example, approximately 0.3 µm. It is noted that the charge accumulating region 14 is formed to have the same thickness and impurity concentration as those of the reset transistor 16 and the source region 27. Such a feature makes it possible to concurrently form the charge accumulating region 14 and the source region 27, contributing to the reduction of manufacturing time for the solid-state imaging device.

Then, as shown in the illustration (d) in FIG. 4, a typical solid-state imaging device manufacturing method is employed to form the insulating layer 26 and the contact wire 25 so that signal charges are transferred from the photoelectric converting film 12 to the charge accumulating region 14. Furthermore, a metal film is deposited on the epilayer 2 by sputtering and CVD, and the metal film is patterned by lithography and dry etching to form the pixel electrode 11. After that, the photoelectric converting film 12 is formed on the pixel electrode 11 by vapor deposition or adhesion, and the transparent electrode 13 for passing incident light to the photoelectric converting film 12 is formed by sputtering.

Through the above process, the solid-state imaging device in FIG. 3 is manufactured.

As described above, the solid-state imaging device according to Embodiment 1 includes the charge barrier region 21 below the charge accumulating region 14, and the charge draining region 22 below the charge barrier region 21. Hence, even though holes are accumulated in the n-type charge accumulating region 14, followed by a potential increase, the holes drain into the charge draining region 22 when the potential reaches a predetermined level. Such features contributes to lessening damages to the reset transistor 16 while the charge accumulating region 14 doubles as the drain region of the reset transistor 16 and to the amplifying transistor to which the charge accumulating region 14 electrically connects.

Modification

Figure 5:
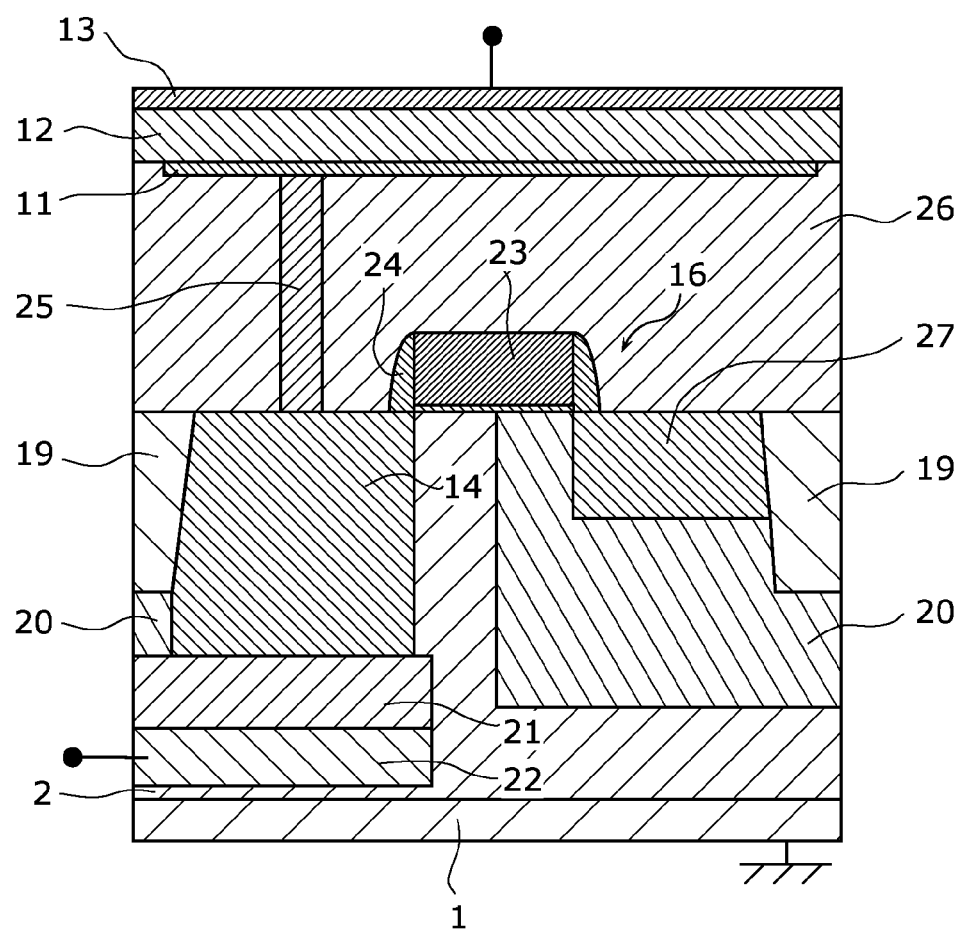
FIG. 5 depicts a cross-sectional view exemplifying a structure of the solid-state imaging device according to Modification of Embodiment 1.

FIG. 5 depicts a cross-sectional view exemplifying a structure of a solid-state imaging device (cross-sectional view exemplifying a structure of the unit pixel 100) according to Modification in Embodiment 1.

The solid-state imaging device in Modification is different from the solid-state imaging device in Embodiment 1 in that, in the former solid-state imaging device, the depth between the top surface of the epilayer 2 and the bottom surface of the charge accumulating region 14 in the semiconductor substrate 1 is deeper than the depth between the top surface of the epilayer 2 and the bottom surface of the source region 27. Here, the junction area between the charge accumulating region 14 and the epilayer 2 increases, and more charges can be accumulated. In addition, the charge accumulating region 14 can be formed deeper, and the charge draining region 22 can be positioned deeper. Hence, without making a contact between the separating region 20 and the epilayer 2, the sheet resistance of the separating region 20 forming a well region can be reduced.

Figure 6:
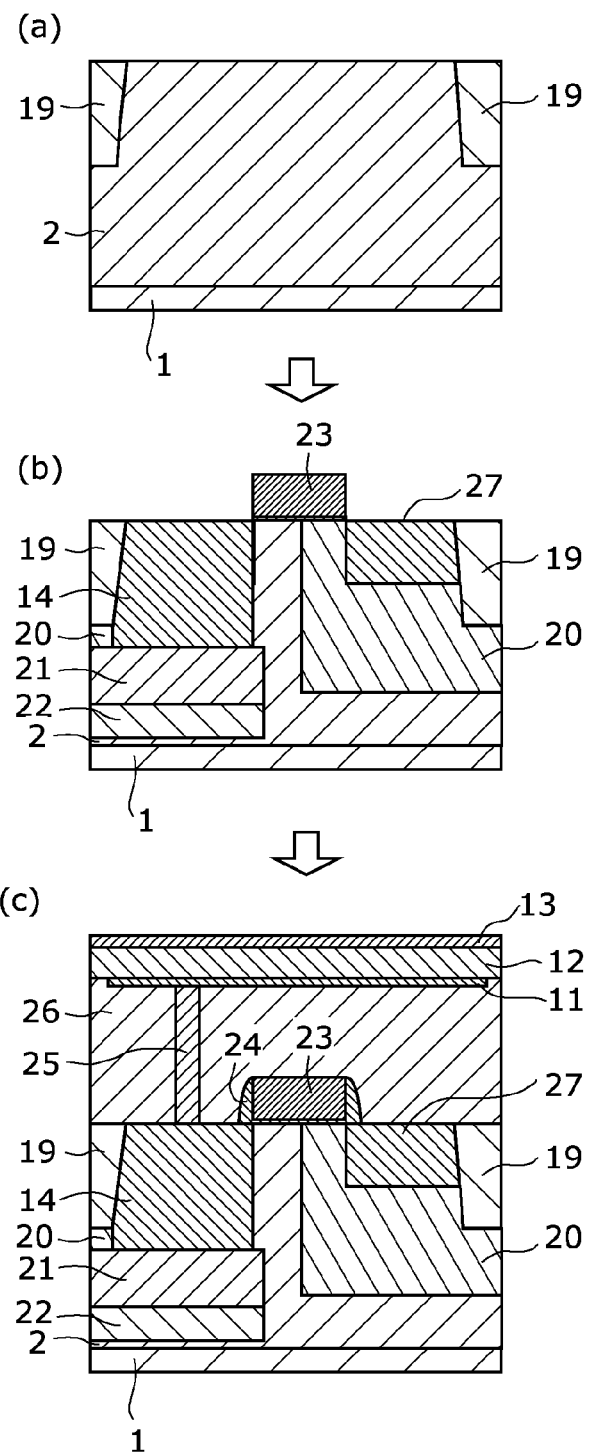
FIG. 6 depicts a cross-sectional view exemplifying a manufacturing process of the solid-state imaging device according to Modification of Embodiment 1.

Described next is how to manufacture the solid-state imaging device according to Modification with reference to FIG. 6. FIG. 6 depicts a cross-sectional view exemplifying a manufacturing process of the solid-state imaging device according to Modification.

First, the process for manufacturing the STI 19 shown in the illustration (a) in FIG. 6 is the same as that shown in the illustration (a) in FIG. 4. A typical solid-state imaging device manufacturing method is employed to form the STI 19 that electrically separates multiple transistors for each unit pixel 100. The STI 19 is formed in the epilayer 2 of a low concentration (for example, $10^{16}$ cm$^{-3}$ to $10^{17}$ cm$^{-3}$) provided above the p-type semiconductor substrate 1 of a high concentration (for example, $10^{18}$ cm$^{-3}$ to $10^{20}$ cm$^{-3}$).

As shown in the illustration (b) in FIG. 6, the epilayer 2 is patterned by lithography to have an opening in a desired region. Using ion implantation with the pattern, the charge accumulating region 14 is formed. The separating region 20, which electrically separates the source region from the drain region of a transistor for each unit pixel 100, and the charge barrier region 21 are also formed by a technique similar to that shown in the illustration (b) in FIG. 4. Then, a typical solid-state imaging device manufacturing method is employed to form the gate oxide and the gate electrode 23 of each of the transistors in the unit pixel 100.

The injected ions for the charge accumulating region 14 have a concentration of, for example, $10^{15}$ cm$^{-3}$ to $10^{18}$ cm$^{-3}$, and the depth between the top surface of the epilayer 2 and the bottom surface of the charge accumulating region 14 is, for example, approximately 2.0 µm. Such a feature makes it possible to have charge accumulating regions 14 formed in a similar shape for each of the unit pixels 100 regardless of the thickness of the gate electrode 23.

The injected ions for the separating region 20 have a concentration of, for example, $10^{16}$ cm$^{-3}$ to $10^{19}$ cm$^{-3}$, and the depth between the top surface of the epilayer 2 and the bottom surface of the separating region 20 is, for example, approximately 2.0 µm.

The charge barrier region 21 is provided between the charge draining region 22 and the charge accumulating region 14. When the potential of the charge accumulating region 14 is low—that is approximately between 0 V to 3 V—, the charge barrier region 21 electrically separates the charge draining region 22 from the charge accumulating region 14. When the potential of the charge accumulating region 14 is approximately 3 V or higher, the charge barrier region 21 drains the charges in the charge accumulating region 22 into the charge draining region 22. Used in Embodiment 1 are the reset transistor 16 and an amplifying transistor both having a breakdown voltage of approximately 3 V. The limit of a breakdown voltage for the transistor can be adjusted by a voltage applied to the charge draining region 22 and the impurity concentration of the charge barrier region 21. The injected ions for the charge barrier region 21 have a concentration of, for example, $10^{15}$ cm$^{-3}$ to $10^{18}$ cm$^{-3}$, and the depth between the top surface of the epilayer 2 and the bottom surface of the charge barrier region 21 is, for example, approximately 0.4 µm to 2.5 µm. Such features make it possible to secure the sheet resistance of the separating region 20 even though the charge draining region 22 occupies a large area. For example, even though the charge draining region 22 is provided to the entire area of the imaging region, the sheet resistance for the separating region 20 in FIG. 5 is half as low as that for the separating region 20 in FIG. 3.

The process shown in the illustration (c) in FIG. 6 for forming constituent elements such as contact wire 25 and the photoelectric converting unit 111 is the same as the process shown in the illustration (d) in FIG. 3.

As to the solid-state imaging device according to Modification described above, the charge accumulating region 14 shaped deeper than the source region 27 is. This feature contributes to reducing the sheet resistance of the separating region 20 and the damage on a transistor.

Although only an exemplary embodiment of this disclosure has been described in detail above, those skilled in the art will readily appreciate that many modifications are possible in the exemplary embodiment without materially departing from the novel teachings and advantages of this disclosure. Accordingly, all such modifications are intended to be included within the scope of this disclosure.

In Embodiment 1, for example, the first conductivity is the n-type, and the second conductivity is the p-type. For example, the semiconductor substrate has the p-type conductivity, and each of the transistors in a pixel circuit is an n-channel one. Instead, the semiconductor substrate may have the n-type conductivity, and each of the transistors in a pixel circuit may be a p-channel one. Here, the polarities of a voltage and a potential are inverted to each other, and the signal charges to be read out from the photoelectric converting film are electrons instead of holes. Accordingly, the source region and the drain region in a reset transistor are inverted to each other.

In Embodiment 1, each of the transistors forming a readout circuit in the unit pixel 100 is a MOS transistor. Instead, any given transistor may be used as far as the transistor is a field effect transistor (FET).

In Embodiment 1, the semiconductor substrate 1 is provided separately from the epilayer 2; however, the semiconductor substrate for the present disclosure is a combination of the semiconductor substrate 1 and the epilayer 2; that is, the epilayer 2 is formed on the surface of the semiconductor substrate 1.

Embodiment 2

Described hereinafter is a solid-state imaging device according to Embodiment 2 with reference to the drawings.

COMPARATIVE EXAMPLE

Before describing the Embodiment 2, detailed here as Comparative Example are problems to occur when a driving technique for a typical CMOS image sensor is applied to a conventional stacked image sensor.

In the stacked image sensor described in PTL 1, a photoelectric converting unit for each of the pixels includes: a pixel electrode; a photoelectric converting film stacked above (light-receiving opening side) the pixel electrode; and a counter electrode formed on the top surface of the photoelectric converting film. Moreover, the stacked image sensor sends a group of charges generated from incident light as a current signal out of the photoelectric converting unit via the pixel electrode. Typically, a charge blocking layer is provided for transferring the signal charges and blocking the charges that are electrically opposite the signal charges in order to select a type of the signal charges. The charge blocking layer faces the pixel electrode or directly makes contact with the pixel electrode.

Figure 7:
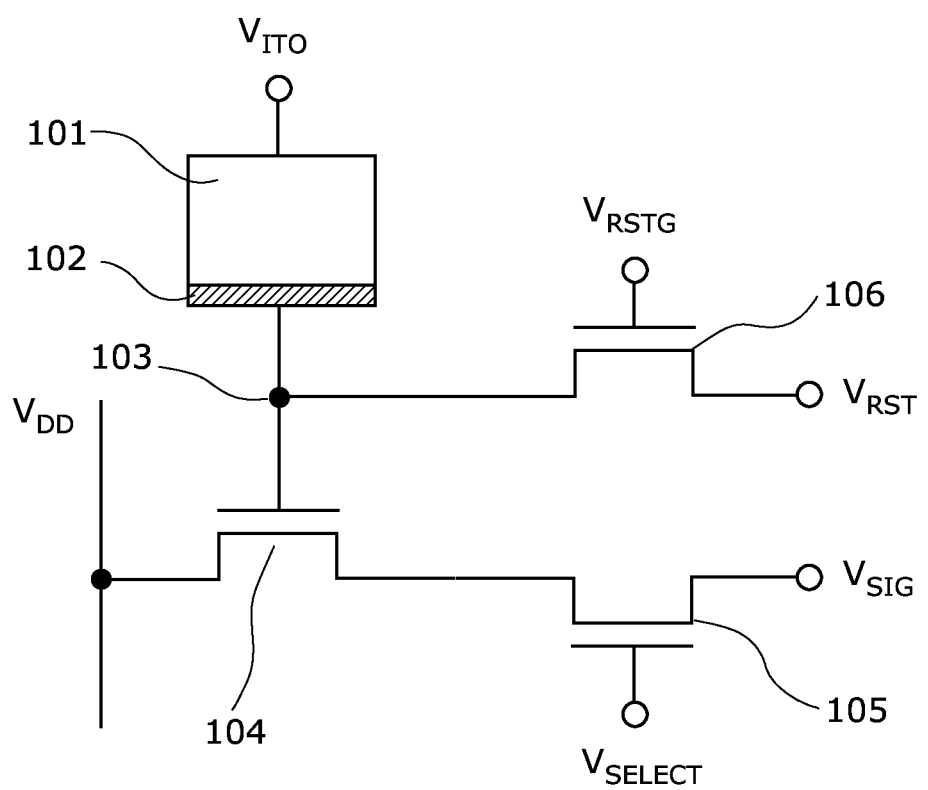
FIG. 7 depicts a block diagram showing a structure of a pixel unit for a stacked solid-state imaging device according to Comparative Example.

FIG. 7 schematically shows the circuit of a pixel unit included in a typical stacked image sensor and utilizing the organic film described in PTL 1 as the photoelectric converting unit. It is noted that the circuit illustrated in FIG. 7 is equivalent to the circuit in FIG. 15; however, the arrangement of constituent elements for the circuit in FIG. 7 is modified accordingly for the sake of explanation.

The signal charges outputted from the photoelectric converting unit via the pixel electrode 102 are accumulated in the charge accumulating unit 103 that is a depletion layer capacitance formed on the substrate. Through a wire, the charge accumulating unit 103 is connected to the input gate of the amplifying transistor 104. When a voltage variation is detected due to a fluctuation in the amount of the accumulated charges, the accumulated charges are outputted as a readout signal via a selecting transistor 105 for selecting a readout timing point for the pixel. The charge accumulating unit 103 is further connected to the drain of the reset transistor 106 in order to execute a reset operation for draining charges remaining in the charge accumulating unit 103 after the signal charges are read out. The reset operation sets the voltage of the charge accumulating unit 103 to an initial voltage.

Figure 8:
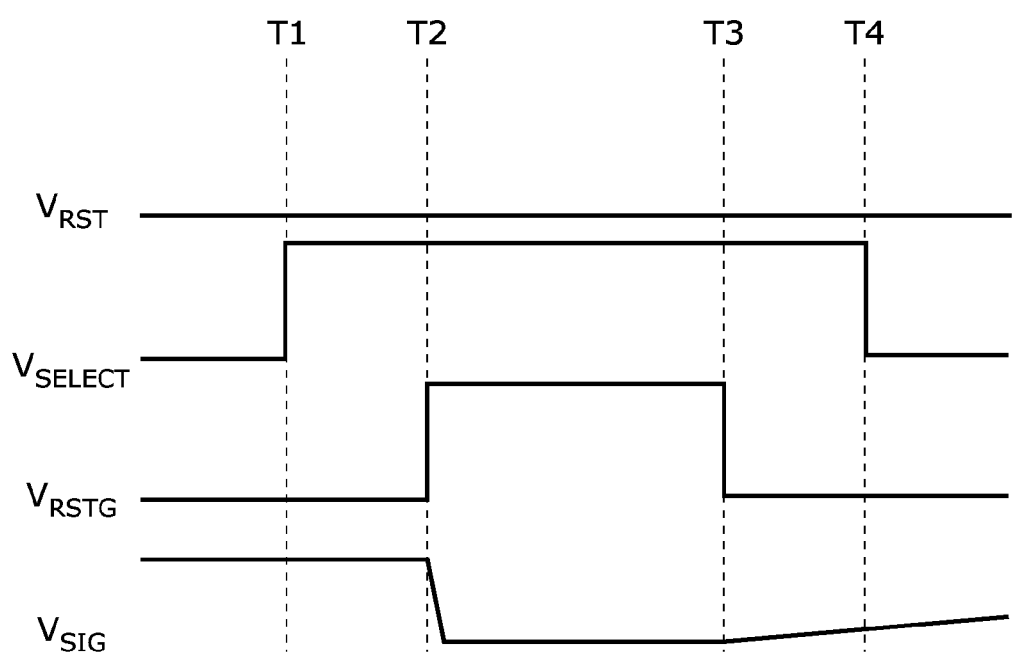
FIG. 8 depicts a timing diagram showing how to drive the stacked solid-state imaging device according to Comparative Example.

FIG. 8 is a typical timing diagram obtained when a stacked image sensor including the pixel unit in FIG. 7 is driven with a sequence of signal readout and reset for a typical CMOS image sensor. FIG. 8 shows an example of a temporal change in voltages, such as $V_{RST}$, $V_{SELECT}$, $V_{RSTG}$, and $V_{SIG}$, for main nodes shown in FIG. 7. Exemplified hereinafter is a case where how a voltage goes high and low when the charge accumulating unit 103 accumulates holes.

At the time T1, a high-level selection signal $V_{SELECT}$ is applied to the gate of the selecting transistor 105 to turn on the gate. Here, the charge accumulating unit 103 accumulates signal charges created depending on the amount of received light. The amplifying transistor 104 generates an accumulated-charge signal. The accumulated-charge signal is an electric signal whose level varies depending on the amount of the signal charges that are generated through photoelectric conversion and accumulated in the charge accumulating unit 103. The accumulated-charge signal is outputted from the selecting transistor 105 as the readout signal $V_{SIG}$.

After that at the time T2, the high-level gate voltage $V_{RSTG}$ (turn-on voltage) is applied to the gate of the reset transistor 106 to turn on the gate, and the low-level reset voltage $V_{RST}$ is applied to the charge accumulating unit 103 to reset the charge accumulating unit 103. In other words, the charges remaining in the charge accumulating unit 103 are neutralized with the charges supplied from the reset transistor 106 and drained.

The operation for reading out the accumulated-charge signal is executed through a sampling on the readout signal $V_{SIG}$ sent from the selecting transistor 105 between the time T1 when the gate of the selecting transistor turns on and a pixel is selected and the time T2 when the charge accumulating unit 103 for the pixel is reset.

At the time T3 when the readout operation for the accumulated-charge signal ends, the gate of the reset transistor 106 turns off. At the time T4, the gate of the selecting transistor 105 turns off.

Between the time T3 when the gate of the reset transistor 106 turns off and the time T4 when the gate of the selecting transistor 105 turns off, the readout signal $V_{SIG}$ is sampled and an initial-state signal (reference value at a zero level) is read out.

The difference between the accumulated-charge signal and the initial-state signal that are read out in the above sequence is outputted as the net amount of the components of an image signal. Correlated double sampling is the most typical technique to calculate the difference.

In capturing an image of an object having high brightness, the driving technique described above suffers from practical problems reading to deterioration in image quality such as, a fluctuating output level, a dark dot, and a constant occurrence of the problems.

As shown in FIG. 7, a large amount of signal charges flow into the charge accumulating unit 103 in capturing an object having high brightness, which causes a rise in a voltage applied to the drain of the charge accumulating unit 103—that is the reset transistor 106—to an extremely high level (for example, a positive supply voltage).

During a charge-accumulating operation, the gate of the reset transistor 106 is off. When the gate of the reset transistor 106 turns on in a reset operation, charges are injected into the channel of the reset transistor 106. The injected charges then gain kinetic energy in the channel due to the great source-drain difference, and become hot carriers. The hot carriers develop impact ionization, creating a large amount of electron-hole pairs.

As a result, a large amount of holes are injected into the substrate around the reset transistor 106 as excessive charges, and the voltage of the substrate changes positive. In other words, immediately after the time T3 when the reset transistor 106 finishes the reset operation, the voltage of the readout signal $V_{SIG}$ is higher than a right reset level for the change to the positive voltage caused by the hole as the excessive charges. When the voltage is sampled and used as the initial-state signal (zero level), the signal level outputted from the calculation after the difference is obtained becomes lower than a right signal level. Consequently, the image inevitably has a dark dot.

In contrast, the impact ionization causes a large amount of electrons to be injected into the gate oxide of the reset transistor 106, leading to deterioration in the switching characteristics of the reset transistor 106. When the degradation in characteristics progresses to be irreversible, the charge accumulating unit 103 cannot be reset to a sufficiently low voltage and always has signal charges left therein; that is, the output level shifts toward the positive voltage side from the right reset output level. Such a problem causes a dark dot as described above. Furthermore, the irreversible degradation in characteristics of the reset transistor 106 causes constant appearance of the dark dot on a pixel—that is image sticking.

Through the above study, the inventors have found the following problems: In relation to a stacked image sensor including the pixel unit shown in FIG. 7, the fluctuation in output and the image sticking, which appear in capturing an image of an object having high brightness, are peculiar phenomena of stacked image sensors. Hence, it is inevitable to solve the problems in order to achieve a practical application of the stacked image sensors.

Detailed hereinafter are specific techniques to solve the above problems.

A solid-state imaging device according to Embodiment 2 shall be described with reference to FIGS. 9 to 12.

Described first is an overall structure of the solid-state imaging device according to Embodiment 2.

Figure 9:
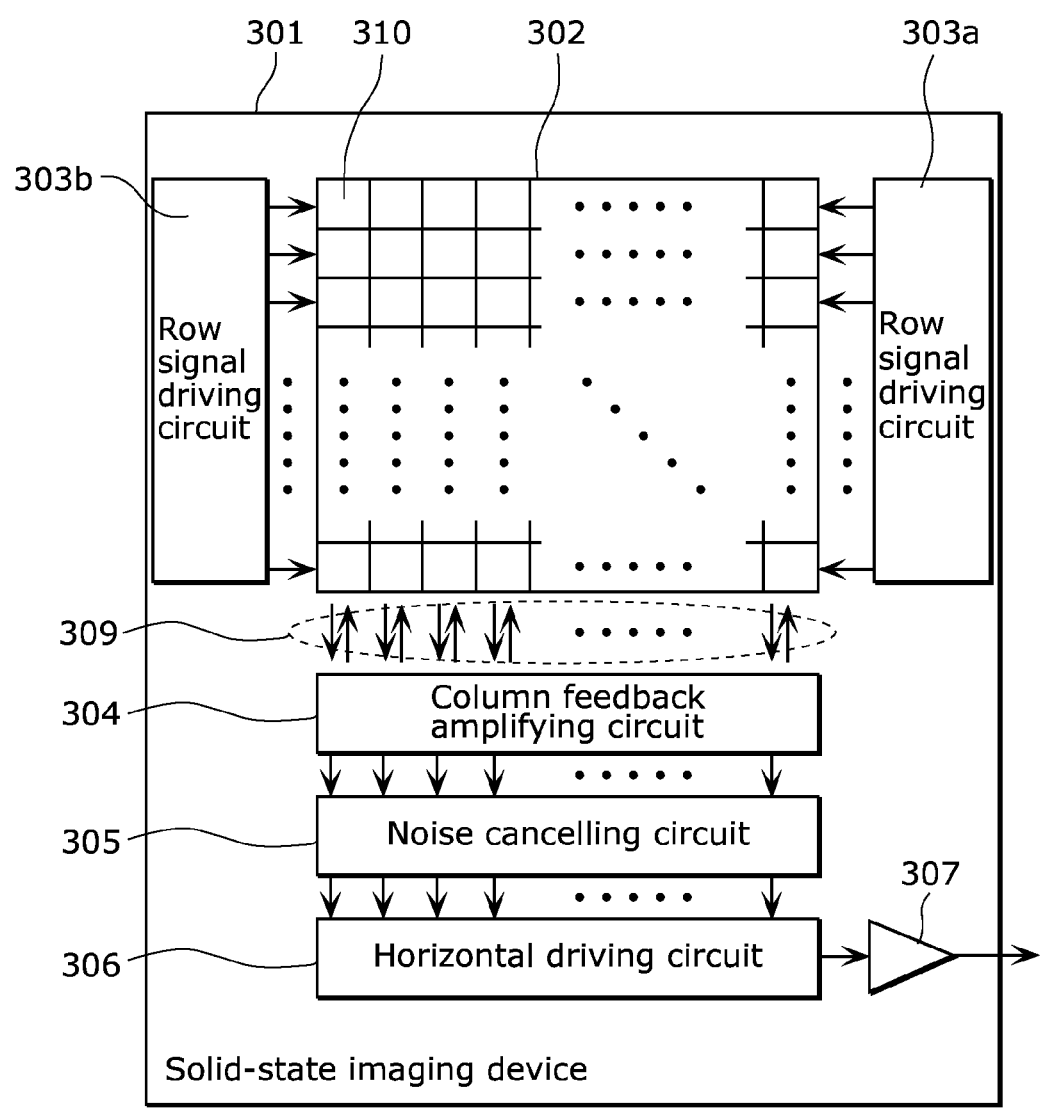
FIG. 9 depicts a block diagram showing a structure of a solid-state imaging device according to Embodiment 2.

FIG. 9 depicts a block diagram showing a structure of a solid-state imaging device 301 according to Embodiment 2. The solid-state imaging device 301 includes: a pixel array 302; row signal driving circuits 303a and 303b; a column feedback amplifying circuit 304 having a circuit for amplification and feedback provided for each of columns; a noise cancelling circuit 305 having a column amplifier and a noise canceller provided for each of the columns; a horizontal driving circuit 306; and an output stage amplifier 307.

The pixel array 302 includes pixels 310 arranged in a matrix, column signal lines (not shown) each provided for a corresponding one of the columns, and row selecting lines each provided for a corresponding one of the rows.

The column feedback amplifying circuit 304 receives output signals from the pixel array 302, and, based on the received output signals, gives feedback of control signals to the pixel array 302. Hence, as arrows 309 in FIG. 9 show, the signals flow bi-directionally to and from the pixel array 302.

Figure 10:
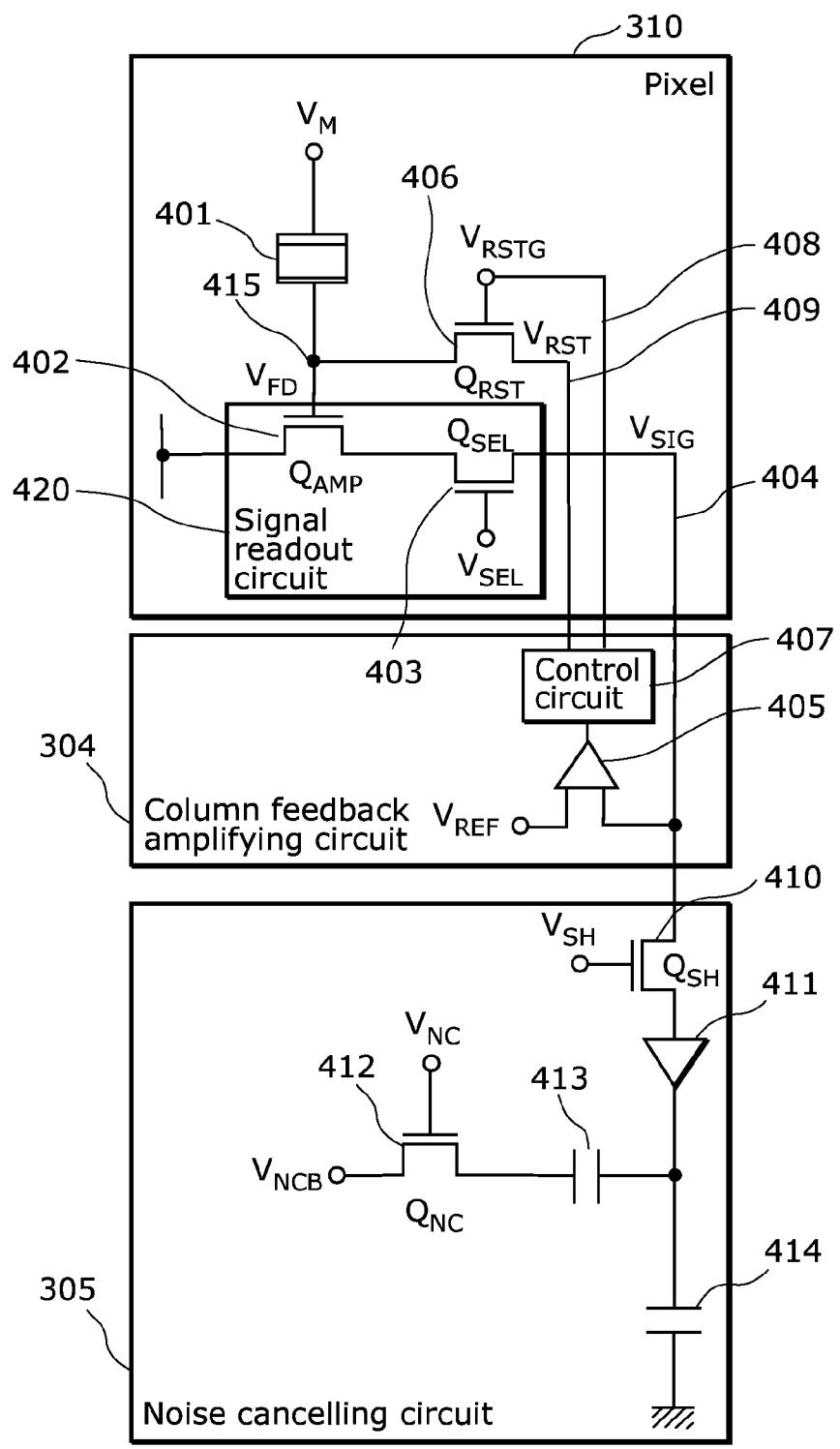
FIG. 10 depicts a circuit diagram of a pixel unit and a signal readout unit according to Embodiment 2.

FIG. 10 depicts a circuit diagram showing a signal readout circuit 420 provided for one of the pixels 310 and peripheral circuits of the signal readout circuit 420.

A column signal line 404 is connected to other pixels (not-shown) provided to the same column as the pixel 310 is. The configuration in FIG. 10 is made for each column.

As shown in FIG. 10, the pixel 310 includes a photoelectric converting unit 401, a reset transistor 406, a floating diffusion unit (FD unit) 415, and a signal readout circuit 420. Furthermore, the solid-state imaging device 301 includes: a column signal line 404; a comparator 405; a control circuit 407 for supplying a control signal to the reset transistor 406 in response to an output from the comparator 405; a column selecting transistor 410; a column amplifying circuit 411; a bias transistor 412; and capacitors 413 and 414. Here, the column signal line 404, the comparator 405, the control circuit 407, the column selecting transistor 410, the column amplifying circuit 411, the bias transistor 412, and the capacitors 413 and 414 are provided to each column.

The comparator 405 and the control circuit 407 form the column feedback amplifying circuit 304. The column selecting transistor 410, the column amplifying circuit 411, the bias transistor 412, and the capacitors 413 and 414 form the noise cancelling circuit 305.

The photoelectric converting unit 401 photo-electrically converts incident light into generate signal charges based on the amount of the incident light.

The signal readout circuit 420 outputs a readout signal $V_{SIG}$ based on the signal charges generated by the photoelectric converting unit 401. The signal readout circuit 420 includes an amplifying transistor 402 and a selecting transistor 403.

The amplifying transistor 402 generates a readout signal $V_{SIG}$ whose level is based on the amount of the signal charges generated by the photoelectric converting unit 401 and accumulated in the FD unit 415. Here, the FD unit 415 is an example of a charge accumulating unit.

The selecting transistor 403 controls whether or not the readout signal $V_{SIG}$ generated by the amplifying transistor 402 is sent to the column signal line 404.

The reset transistor 406 applies a voltage to the FD unit 415 to reset the photoelectric converting unit 401 and the FD unit 415.

In response to an output from the comparator 405, the control circuit 407 applies a gate voltage $V_{RSTG}$ to the gate of the reset transistor 406 via a signal line 408, and supplies a reset voltage $V_{RST}$ to the source of the reset transistor 406 via a signal line 409. Here the gate voltage $V_{RSTG}$ controls an on-off state of the gate of the reset transistor 406, and the reset voltage $V_{RST}$ is variable between, for example, a ground potential (GND) and a potential ($V_{HIGH}$) higher than the GND.

The column selecting transistor 410 controls whether or not the readout signal $V_{SIG}$ is sent to the input terminal of the column amplifying circuit 411.

The bias transistor 412 and the capacitors 413 and 414 are connected in series. The bias transistor 412 controls whether or not a bias voltage $V_{NCB}$ is applied to the capacitor 413.

A signal amplified by the column amplifying circuit 411 is inputted to a difference circuit formed of the bias transistor 412 and the capacitors 413 and 414. The difference circuit detects a voltage corresponding to a net amount of the components of an image signal, by carrying out a difference operation based on the redistribution of signal charges between the capacitors 413 and 414.

Figure 11:
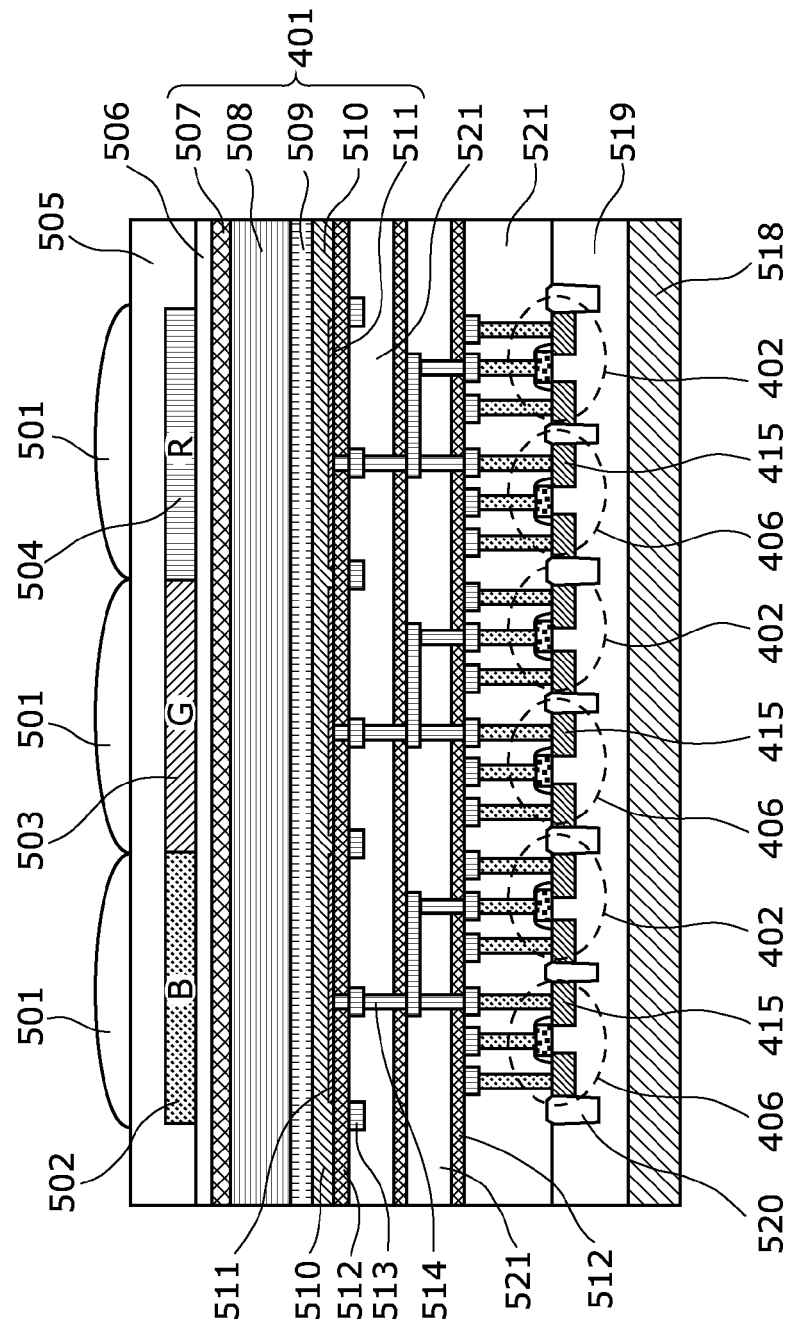
FIG. 11 depicts a cross-sectional view of a device for three pixels according to Embodiment 2.

FIG. 11 depicts a cross-sectional view showing an example of a region for three pixels in the solid-state imaging device 301. Actually, as many as 10 million pixels 310 are arranged on the pixel array 302, for example.

As shown in FIG. 11, the solid-state imaging device 301 includes: micro lenses 501; a blue color filter 502; a green color filter 503; a red color filter 504; a protection film 505; a planarizing film 506; an upper electrode 507 (second electrode); a photoelectric converting film 508; an electron blocking layer 509; an inter-electrode insulating film 510; a lower electrode 511 (first electrode); an insulating film 512; a power supply layer 513; a via 514; a substrate 518; a well 519; an STI region 520; and an interlayer insulating layer 521.

The upper electrode 507 (second electrode), the photoelectric converting film 508, the electron blocking layer 509, the inter-electrode insulating film 510, and the lower electrode 511 (first electrode) form the photoelectric converting unit 401. The cross-sectional view in FIG. 11 shows the FD unit 415, the amplifying transistor 402, and the reset transistor 406 formed with a use of a diffusion region formed on the substrate 518.

The substrate 518 is a semiconductor substrate. An exemplary substrate 518 is a silicone substrate.

The micro lenses 501 are each provided for a pixel 310 on the outermost surface of the solid-state imaging device 301 in order to efficiently collect incident light.

The blue color filter 502, the green color filter 503, and the red color filter 504 are formed to capture a color image. The blue color filter 502, the green color filter 503, and the red color filter 504 are each provided directly below a corresponding one of the micro lens 501 and formed in the protection film 505.

Such optical devices are formed above the planarizing film 506 in order to form a group of the micro lens 501 and the color filters for as many as 10 million pixels without causing uneven light collection and uneven colors. The planarizing film 506 includes, for example, SiN.

The upper electrode 507 is formed under the planarizing film 506 across the pixel array 302. The upper electrode 507 passes visible light. The upper electrode 507 includes, for example, Indium Tin Oxide (ITO).

The photoelectric converting film 508 converts light into signal charges. Specifically, the photoelectric converting film 508 is formed under the upper electrode 507 and includes organic molecules having high optical absorbance. The photoelectric converting film 508 is 500 nm in thickness, for example. The photoelectric converting film 508 is formed by vacuum deposition. The above organic molecules have high optical absorbance across the visible light with the wave lengths of 400 nm to 700 nm.

The electron blocking layer 509 is formed under the photoelectric converting film 508, and blocks the injection of the electrons from the lower electrode 511 as well as transmits holes generated by the photoelectric conversion of incident light. The electron blocking layer 509 is formed on the inter-electrode insulating film 510 having high flatness and above the lower electrode 511.

Multiple lower electrodes 511, including the lower electrode 511, are arranged in a matrix above the substrate 518. The lower electrodes 511 are formed to be electrically separate from each other. Specifically, the lower electrodes 511 are formed in the inter-electrode insulating film 510 and collect the holes generated by the photoelectric converting film 508. The lower electrodes 511 include TiN, for example. The lower electrodes 511 are formed on the planarized insulating film 512 of 100 nm in thickness.

The neighboring lower electrodes 511 are formed at intervals of 0.2 μm. The intervals are filled with the inter-electrode insulating film 510.

Furthermore, the power supply layer 513 is provided below the intervals under the insulating film 512. The power supply layer 513 includes, for example, Cu. Specifically, each of power supply layers 513 is a region between the neighboring lower electrodes 511, and formed between the neighboring lower electrodes 511 and the substrate 518. The power supply layer 513 can receive a potential which is independent from the potential for the lower electrodes 511.

Specifically in an exposure operation when the photoelectric converting unit 401 performs photoelectric conversion and in a readout operation when the signal readout circuit 420 generates a readout signal, a potential is supplied to the power supply layer 513 for repelling signal charges. When the signal charges are holes, for example, a positive voltage is applied. The application of the positive voltage prevents holes from entering into each of the pixels from the neighboring pixels. It is noted that the control of the voltage application can be performed, for example, by a control unit (not shown) included in the solid-state imaging device 301.

The power supply layer 513 is connected with the via 514. The via 514 is connected with the FD unit 415 and the gate terminal of the amplifying transistor 402. Furthermore, the FD unit 415 is electrically connected to the source terminal of the reset transistor 406. The source terminal of the reset transistor 406 and the FD unit 415 share the diffusion region. The FD unit 415, the amplifying transistor 402, the reset transistor 406, and a not-shown selecting transistor are all formed within the single p-type well 519. The well 519 is formed on the substrate 518.

In addition, each transistor is electrically separated by the STI region 520 including $SiO_2$.

As shown in the above structure, the signal readout circuit 420 in FIG. 10 is formed above the substrate 518. The signal readout circuit 420 causes the FD unit 415 to accumulate signal charges generated by the photoelectric converting unit 401 via the lower electrode 511 and the via 514, and causes the amplifying transistor 402 to generate a readout signal $V_{SIG}$ whose level is based on the amount of the signal charges accumulated in the FD unit 415.

Described hereinafter is how to drive the solid-state imaging device 301. It is noted that the generation of a control signal described below is executed by, for example, a control unit (not-shown) included in the solid-state imaging device 301.

Figure 12:
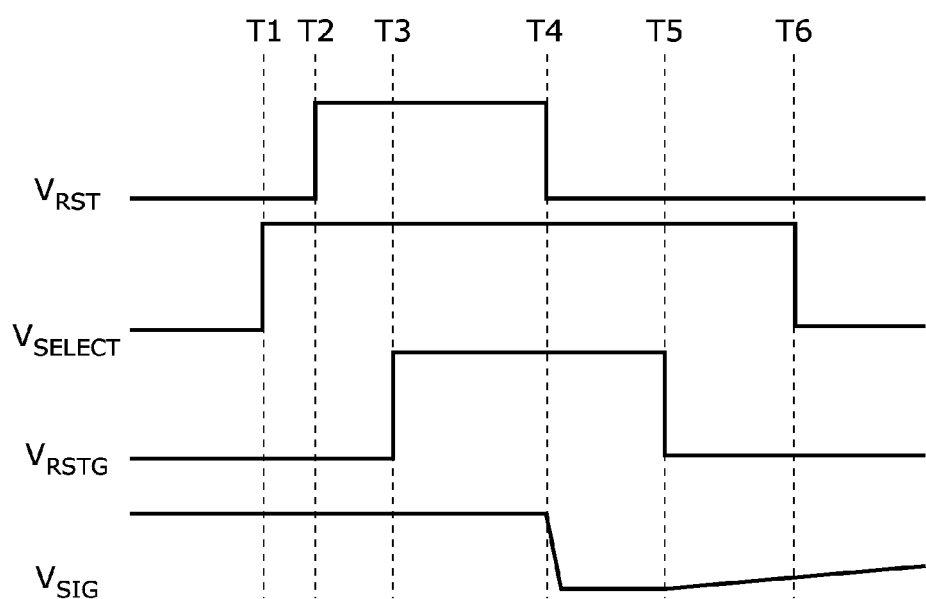
FIG. 12 is a timing diagram showing how to drive the solid-state imaging device according to Embodiment 2.

FIG. 12 is a timing diagram showing a temporal change in voltages, such as $V_{RST}$, $V_{SELECT}$, $V_{RSTG}$, and $V_{SIG}$, for main nodes shown in FIG. 10.

At the time T1, a high-level selection signal $V_{SELECT}$ is applied to the gate of the selecting transistor 403 to turn on the gate, and the readout signal $V_{SIG}$ generated by the amplifying transistor 402 is outputted to the column signal line 404. The comparator 405 compares the level of the readout signal $V_{SIG}$ with a predetermined reference level voltage $V_{REF}$, and supplies the control circuit 407 with a signal indicating the result of the comparison.

At time T2, the control circuit 407 applies a positive reset voltage $V_{RST}$ (for example, a positive supply voltage) to the source of the reset transistor 406. Here even though a large amount of signal charges are generated by the photoelectric converting unit 401 and accumulated in the FD unit 415, and the excessive signal charges cause the rise in the drain voltage of the reset transistor 406 to a high positive value, the source-drain voltage of the reset transistor 406 successfully falls by the level of the positive reset voltage $V_{RST}$. The positive reset voltage $V_{RST}$ is an example of a first voltage which repels the charges (holes) accumulated in the FD unit 415.

After that at the time T3, the control circuit 407 turns on the gate of the reset transistor 406 by applying the high-level gate voltage $V_{RSG}$ (turn-on voltage) to the gate of the reset transistor 406, while applying the high-level reset voltage $V_{RST}$ to the source of the reset transistor 406.

In this driving technique, the source-drain voltage of the reset transistor 406 is previously kept low at the time T2 since the positive reset voltage $V_{RST}$ is applied. Such a feature contributes to curbing the impact ionization observed when the gate voltage $V_{RSTG}$ goes from low to high. Consequently, the feature successfully reduces generation of excessive charges due to the impact ionization, and prevents damage on the reset transistor 406 and a fluctuation in substrate potential. In addition, the source-drain voltage of the reset transistor 406 is low at the moment when the gate of the reset transistor 406 turns on. Thus, the readout signal $V_{SIG}$ shows very little fluctuation.

After that at time T4, the control circuit 407 resets the FD unit 415 by decreasing the reset voltage $V_{RST}$ to one of a positive voltage, a ground voltage, and a negative voltage (for example, a negative supply voltage), while applying the high-level gate voltage $V_{RSTG}$ to the gate of the reset transistor 406. Here, the positive voltage, the ground voltage, and the negative voltage are lower than the first voltage. The positive voltage, the ground voltage, and the negative voltage lower than the first voltage are an example of a second voltage which attracts the charges (holes) accumulated in the FD unit 415.

The readout operation for the accumulated-charge signal generated of the signal charges created by the photo-electrical conversion is executed by sampling of the readout signal $V_{SIG}$ between the time T1 when the gate of the selecting transistor 403 turns on and a pixel 310 is selected and the time T2 when the FD unit 415 of the pixel 310 is reset. At the time T5 when the readout operation for the accumulated-charge signal ends, the gate of the reset transistor 406 turns off. At the time T6, the gate of the selecting transistor 403 turns off.

Between the time T5 when the gate of the reset transistor 406 turns off and the time T6 when the gate of the selecting transistor 403 turns off, the readout signal $V_{SIG}$ is sampled and an initial-state signal is read out.

The noise cancelling circuit 305 calculates the difference between the accumulated-charge signal and the initial-state signal that are read out in the above sequence, and outputs the calculated difference as the net amount of the components of an image signal.

The driving technique makes it possible to execute a reset operation which keeps from the impact ionization that causes a dark dot and image sticking in resetting for capturing an object having high brightness.

The resulting solid-state imaging device and the driving method of the solid-state imaging device can curb generation of excessive charges due to the impact ionization caused in a reset transistor when resetting, prevent an output level from fluctuating and the reset transistor from degrading in characteristics, and capture an image having high quality without a dark dot and image sticking.

It is noted that the above sequence may involve the following: A threshold is used as the reference level voltage $V_{REF}$ to determine a level which could cause the impact ionization at the reset transistor 406, for example; and, if the comparator 405 determines that the level of the readout signal $V_{SIG}$ is lower than or equal to the reference level voltage $V_{REF}$, the control circuit 407 stops the variation in the reset voltage $V_{RST}$ between the times T2 and T4 and controls the on-off state of the gate of the reset transistor 406 while keeping the reset voltage $V_{RST}$ fixed low. Such features make it possible to reduce power consumption resulting from the variation in the level of the reset voltage $V_{RST}$, when the intensity of light from an object having high brightness is rather low and there is no concern about the impact ionization. This contributes to a decrease in the power consumption of the solid-state imaging device 301.

Moreover, the control circuit 407 may calculate a voltage $V_{FD}$ of the FD unit 415 based on the level of the readout signal $V_{SIG}$, and apply the reset voltage $V_{RST}$ equal to the calculated voltage $V_{FD}$ to the source of the reset transistor 406. Such a feature makes it possible to alter the reset voltage $V_{RST}$ in the minimum amplitude that can prevent the impact ionization, and contributes to a decrease in the power consumption of the solid-state imaging device 301.

In the above technique, the control circuit 407 turns on the gate of the reset transistor 406 while applying a positive voltage—the first voltage—to the source of the reset transistor 406, and drops the voltage to be applied to the source of the reset transistor 406 to the second voltage lower than the first voltage while leaving the gate of the reset transistor 406 on.

Such driving techniques make it possible to prevent the impact ionization in the reset transistor 406 when the FD unit 415 accumulates the holes.

When the FD unit 415 accumulates electrons, the control circuit 407 may turn on the gate of the reset transistor 406 while applying a negative voltage—the first voltage—to the source of the reset transistor 406, and raise the voltage to be applied to the source of the reset transistor 406 to the second voltage (for example one of a negative voltage, a ground voltage, and a positive voltage) higher than the first voltage while leaving the gate of the reset transistor 406 on.

Such driving techniques make it possible to prevent the impact ionization in the reset transistor 406 when the FD unit 415 accumulates the holes, as described above.

Embodiment 3

Described hereinafter is a driving technique according to Embodiment 3, with reference to FIG. 13. Embodiment 3 shows another driving technique executed by the solid-state imaging device 301 illustrated in FIGS. 9 and 10. It is noted that the descriptions of the same features shared with Embodiment 2 are omitted accordingly, and mainly described hereinafter are differences between this embodiment and Embodiment 2.

Figure 13:
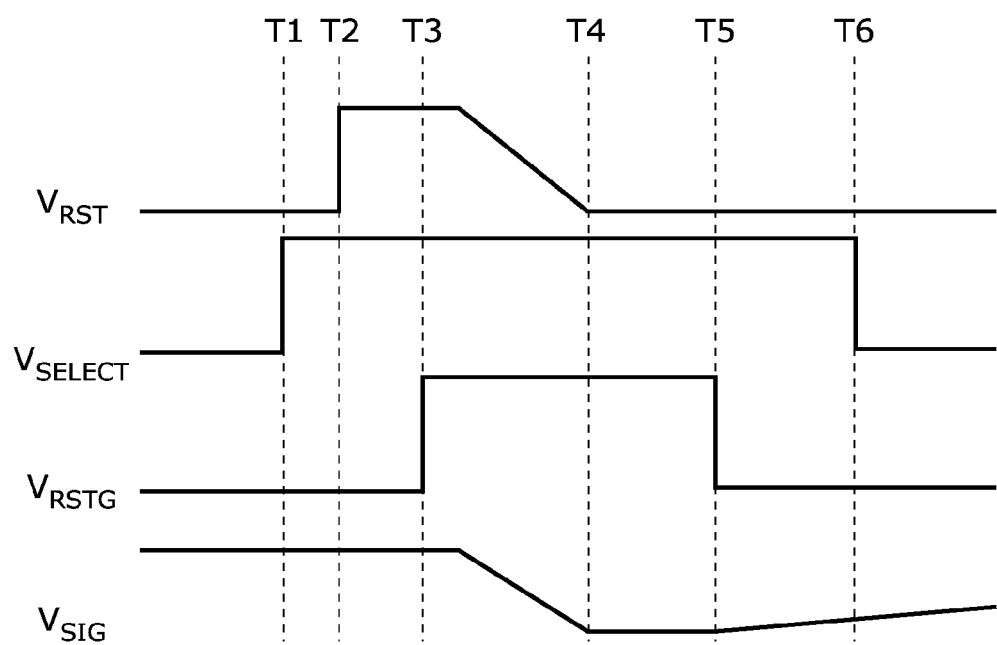
FIG. 13 is a timing diagram showing how to drive a solid-state imaging device according to Embodiment 3.

FIG. 13 is a timing diagram showing a temporal change in voltages, such as $V_{RST}$, $V_{SELECT}$, $V_{RSTG}$, and $V_{SIG}$, for main nodes shown in FIG. 10.

In the driving technique in Embodiment 3, the same sequence as that in Embodiment 2 is executed between the times T1 and T3. The resulting effects are the same as those in the Embodiment 2. In the driving technique in Embodiment 3, the source-drain voltage of the reset transistor 406 is previously kept low at the time T2. Such feature contributes to curbing the impact ionization observed when the gate voltage $V_{RSTG}$ goes from low to high. Consequently, the feature successfully reduces generation of excessive charges due to the impact ionization, and prevents damage on the reset transistor 406 and a fluctuation in substrate potential. In addition, the source-drain voltage of the reset transistor 406 is low at the moment when the gate of the reset transistor 406 turns on. Thus the readout signal $V_{SIG}$ shows very little fluctuation.

The driving technique in Embodiment 3 is different from that in Embodiment 2 in that, once the gate of the reset transistor 406 has been turned on after the time T3, the former driving technique gradually reduces the reset voltage $V_{RST}$ low until the time T4. At the time T4, the reset voltage $V_{RST}$ becomes completely low, and the FD unit 415 is completely reset. At the time T4, the readout signal $V_{SIG}$ drops as low as the level of the initial-state signal.

In the driving technique, the reset voltage $V_{RST}$ gradually reduces. Such a feature allows the FD unit 415 to be set to the initial state in which remaining charges are drained, while the value of the source-drain voltage of the reset transistor 406 is kept low.

After that, the same sequence as that in Embodiment 2 is executed between the times T4 and T6. There are two operations similar to those in Embodiment 2: the operation for reading out the accumulated-charge signal and the initial-state signal; and the operation by the noise cancelling circuit 305 of outputting the difference between the accumulated-charge signal and the initial-state signal as the net amount of the components of an image signal. Thus, the details thereof shall be omitted.

Hence, the driving technique according to Embodiment 3 makes it possible to execute a reset operation which keeps from the impact ionization that causes a dark dot and image sticking in resetting for capturing an object having high brightness.

Embodiment 4

Described hereinafter is a driving technique according to Embodiment 4, with reference to FIG. 14.

Embodiment 4 shows still another driving technique executed by the solid-state imaging device 301 illustrated in FIGS. 9 and 10. It is noted that the descriptions of the same features shared with Embodiments 2 and 3 are omitted accordingly, and mainly described hereinafter are differences between this embodiment and Embodiments 2 and 3.

Figure 14:
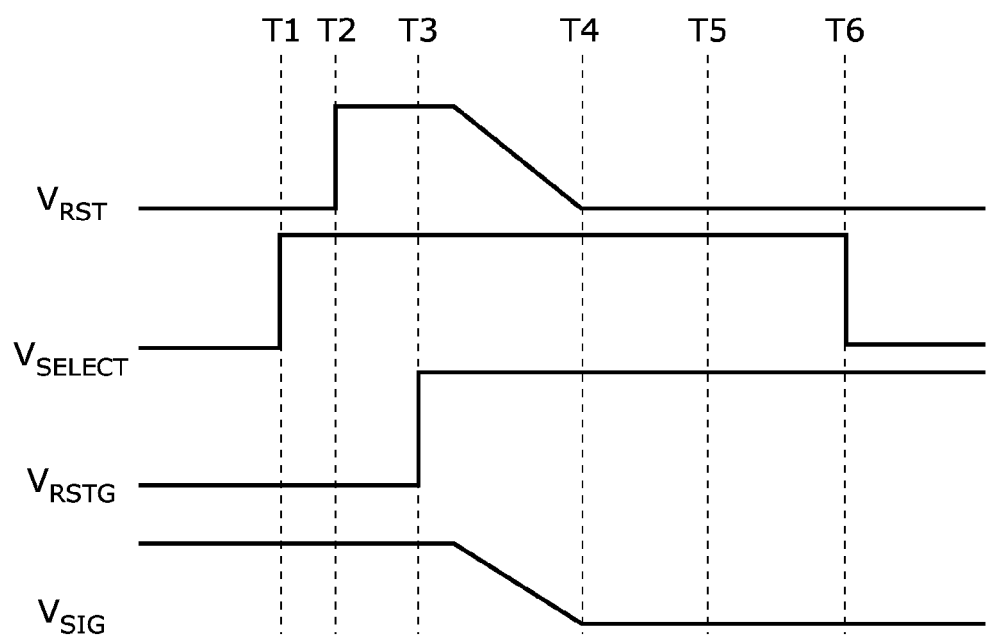
FIG. 14 is a timing diagram showing how to drive a solid-state imaging device according to Embodiment 4.

FIG. 14 is a timing diagram showing a temporal change in voltages, such as $V_{RST}$, $V_{SELECT}$, $V_{RSTG}$, and $V_{SIG}$, for main nodes shown in FIG. 10. The driving technique in Embodiment 4 additionally includes a counter measure to cope with a case where an object is excessively bright and a continual use of the driving techniques in Embodiments 2 and 3 could cause image sticking.

Embodiments 2 and 3 employ the reference level voltage $V_{REF}$ to determine a level where impact ionization could occur in the reset transistor 406. Embodiment 4 employs the reference level voltage $V_{REF}$ to determine a level where image sticking appears in continual imaging. In other words, the reference level voltage $V_{REF}$ used in Embodiment 4 is higher than the reference level voltage $V_{REF}$ used in Embodiments 2 and 3.

The driving technique in Embodiment 4 differs from those in Embodiments 2 and 3 (FIGS. 12 and 13) as follows: if the comparator 405 determines that the level of the readout signal $V_{SIG}$ is higher than the reference level voltage $V_{REF}$ that indicates a level where continual imaging could cause image sticking, a high-level gate voltage $V_{RSTG}$ (turn-on voltage) is continuously applied to the gate of the reset transistor 406 after the time T5 when the reset operation ends, so that the voltage application can leave the gate of the reset transistor 406 on and short-circuit the source of the reset transistor 406 to GND (to fix the reset voltage $V_{RST}$ low). Such features successfully stop the successive imaging operations and thus cancel further readout operations for an accumulated-charge signal and an initial-state signal.

Hence, the driving technique according to Embodiment 4 can implement a reset operation with no impact ionization that causes a dark dot and image sticking during the reset operation in capturing an object with high brightness, and can provide an appropriate counter measure to the case where the object is excessively bright and continual imaging would inevitably cause such image sticking.

It is noted that if the comparator 405 determines that the level of the readout signal $V_{SIG}$, which is read out from the pixel 310, is higher than a level which could cause image sticking, the control circuit 407 may continuously execute a reset operation to another pixel.

In other words, the control circuit 407 may continuously apply the turn-on voltage to the gate of a reset transistor of another pixel included in the same column, and fix a reset voltage to be supplied to the reset transistor low. Furthermore, the control circuit 407 may cause another control circuit provided to another column to continuously apply the turn-on voltage to the gate of a reset transistor included in a pixel in another column, and fix a reset voltage to be supplied to the reset transistor low.

The above structures can immediately protect a reset transistor for another pixel in the case where the object is excessively bright and continual imaging could cause image sticking also in the other pixel.

It should be noted that although the present disclosure is described based on aforementioned embodiments, the present disclosure shall not be limited to such embodiments. In addition, for example, the control circuit 407 may be controlled with higher freedom by a control signal sent from outside the chip.

Part or all of the constituent elements constituting the solid-state imaging devices according to the embodiments may typically be configured in a form of a Large-Scale Integration (LSI). The constituent elements may be each made as a separate individual chip, or as a single chip to include a part or all thereof.

The means for circuit integration is not limited to the LSI, and implementation in the form of a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

In the cross-sectional views, the corners and edges of the constitutional elements are linearly illustrated. In the present disclosure, however, the corners and edges may also be roundish due to manufacturing reasons.

It is noted that at least some of the functions of the solid-state imaging device according to the embodiments and Modification thereof may be combined.

All the numerical values are examples to specifically describe the present disclosure, and the present disclosure shall not be defined by these values. All the voltage levels represented by high/low and the switching states represented by on/off are examples to specifically disclose the present disclosure. A different combination of the exemplified logic levels and switching conditions can obtain similar results as obtained above. The conductivity types of the diffusion regions for the substrates are examples to specifically describe the present disclosure. The conductivity types may be inverted to each other to obtain similar results as obtained above.

All the above-described materials of each of the constituent elements are examples, and the present disclosure shall not be defined by these materials. The connecting schemes between the constituent elements are examples, and the connecting schemes to implement the functions of the present disclosure shall not be defined by these schemes.

The above embodiments show the MOS transistor as an exemplary transistor; instead, a transistor of another kind may be used.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to solid-state imaging devices, and in particular, to a solid-state imaging device which requires high reliability against bright incident light. The present disclosure is applicable to appliances such as monitoring cameras, Internet Protocol cameras, on-board cameras, digital cameras, and cellular phones.

The invention claimed is:

1. A solid-state imaging device comprising:
a substrate;
a first electrode formed above the substrate;
a photoelectric converting film formed above the first electrode and converting light into signal charges;
a second electrode formed on the photoelectric converting film;
a charge accumulating unit formed on the substrate, electrically connected to the first electrode, and configured to accumulate charges flowing from the first electrode;
a reset transistor having a drain electrically connected to the charge accumulating unit;
a signal readout circuit electrically connected to the charge accumulating unit, and generating a readout signal which is an electric signal and whose level is based on an amount of the charges accumulated in the charge accumulating unit; and
a control circuit (i) applying a turn-on voltage to a gate of the reset transistor while applying a first voltage to a source of the reset transistor, and (ii) varying a voltage being applied to the source from the first voltage to a second voltage while applying the turn-on voltage to the gate, the turn-on voltage turning on the gate of the reset transistor, the first voltage repelling the charges accumulated in the charge accumulating unit, and the second voltage attracting the charges accumulated in the charge accumulating unit,
wherein, while the gate of the reset transistor is on, the control circuit gradually varies the voltage being applied to the source from the first voltage to the second voltage, so that a time period for the gradual variation takes longer than or equal to a time period required for a pulse to the gate to either rise or fall.

2. A solid-state imaging device comprising:
a substrate;
a first electrode formed above the substrate;
a photoelectric converting film formed above the first electrode and converting light into signal charges;
a second electrode formed on the photoelectric converting film;
a charge accumulating unit formed on the substrate, electrically connected to the first electrode, and configured to accumulate charges flowing from the first electrode,
a reset transistor having a drain electrically connected to the charge accumulating unit;
a signal readout circuit electrically connected to the charge accumulating unit, and generating a readout signal which is an electric signal and whose level is based on an amount of the charges accumulated in the charge accumulating unit;
a control circuit (i) applying a turn-on voltage to a gate of the reset transistor while applying a first voltage to a source of the reset transistor, and (ii) varying a voltage being applied to the source from the first voltage to a second voltage while applying the turn-on voltage to the gate, the turn-on voltage turning on the gate of the reset transistor, the first voltage repelling the charges accumulated in the charge accumulating unit, and the second voltage attracting the charges accumulated in the charge accumulating unit, and
a comparator comparing the readout signal with a first reference level,
wherein if the comparator determines that the level of the readout signal is lower than or equal to the first reference level, the control circuit stops the variation in the voltage being applied to the source and applies the turn-on voltage to the gate while keeping the voltage being applied to the source fixed to the second voltage.

3. The solid-state imaging device according to claim 2, wherein the comparator further compares the readout signal with a second reference level which is higher than the first reference level, and
if the comparator determines that the level of the readout signal is higher than the second reference level, the control circuit (i) applies the turn-on voltage to the gate while applying the first voltage to the source, (ii) varies the voltage being applied to the source from the first voltage to the second voltage while applying the turn-on voltage to the gate, and (iii) continuously applies the turn-on voltage to the gate after the variation.

4. The solid-state imaging device according to claim 3, wherein the first electrode is formed electrically separated into sub first electrodes, the sub first electrodes each corresponds to one of (i) charge accumulating units including the charge accumulating unit, (ii) reset transistors including the reset transistor, (iii) signal readout circuits including the signal readout circuit, (iv) control circuits including the control circuit, and (v) comparators including the comparator, and one of the control circuits causes another one of the control circuits to continuously apply the turn-on voltage to a gate of one of the reset transistors corresponding to the other control circuit, if one of the comparators corresponding to the one control circuit determines that a level of a readout signal for the one comparator is higher than the second reference level.

5. A solid-state imaging device comprising:
a substrate;
a first electrode formed above the substrate;
a photoelectric converting film formed above the first electrode and converting light into signal charges;
a second electrode formed on the photoelectric converting film;
a charge accumulating unit formed on the substrate, electrically connected to the first electrode, and configured to accumulate charges flowing from the first electrode;
a reset transistor having a drain electrically connected to the charge accumulating unit;
a signal readout circuit electrically connected to the charge accumulating unit, and generating a readout signal which is an electric signal and whose level is based on an amount of the charges accumulated in the charge accumulating unit; and
a control circuit (i) applying a turn-on voltage to a gate of the reset transistor while applying a first voltage to a source of the reset transistor, and (ii) varying a voltage being applied to the source from the first voltage to a second voltage while applying the turn-on voltage to the gate, the turn-on voltage turning on the gate of the reset transistor, the first voltage repelling the charges accumulated in the charge accumulating unit, and the second voltage attracting the charges accumulated in the charge accumulating unit,
wherein the charge accumulating unit is configured to accumulate holes as the charges, and
the control circuit (i) turns on the gate of the reset transistor while applying a positive voltage as the first voltage to the source of the reset transistor, and (ii) decreases a voltage being applied to the source of the reset transistor from the first voltage to the second voltage while leaving the gate of the reset transistor on, the second voltage being lower than the first voltage.

6. A solid-state imaging device comprising:
a substrate;
a first electrode formed above the substrate;
a photoelectric converting film formed above the first electrode and converting light into signal charges;
a second electrode formed on the photoelectric converting film;
a charge accumulating unit formed on the substrate, electrically connected to the first electrode, and configured to accumulate charges flowing from the first electrode;
a reset transistor having a drain electrically connected to the charge accumulating unit;
a signal readout circuit electrically connected to the charge accumulating unit, and generating a readout signal which is an electric signal and whose level is based on an amount of the charges accumulated in the charge accumulating unit; and a control circuit (i) applying a turn-on voltage to a gate of the reset transistor while applying a first voltage to a source of the reset transistor, and (ii) varying a voltage being applied to the source from the first voltage to a second voltage while applying the turn-on voltage to the gate, the turn-on voltage turning on the gate of the reset transistor, the first voltage repelling the charges accumulated in the charge accumulating unit, and the second voltage attracting the charges accumulated in the charge accumulating unit,
wherein the charge accumulating unit is configured to accumulate electrons as the charges, and
the control circuit (i) turns on the gate of the reset transistor while applying a negative voltage as the first voltage to the source of the reset transistor, and (ii) increases a voltage being applied to the source of the reset transistor from the first voltage to the second voltage while leaving the gate of the reset transistor on, the second voltage being higher than the first voltage.

7. A method for driving a solid-state imaging device which includes:
a substrate;
a first electrode formed above the substrate;
a photoelectric converting film formed above the first electrode and converting light into signal charges;
a second electrode formed on the photoelectric converting film;
a charge accumulating unit formed on the substrate, electrically connected to the first electrode, and configured to accumulate charges flowing from the first electrode;
a reset transistor has a gate electrically connected to the charge accumulating unit;
a signal readout circuit electrically connected to the charge accumulating unit, and generating a readout signal whose level is based on an amount of charges accumulated in the charge accumulating unit; and
a control circuit which independently supplies a voltage to each of a source and a gate of the reset transistor,
the method comprising:
applying by the control circuit a turn-on voltage to the gate of the reset transistor to turn the gate on while applying by the control circuit a first voltage to the source of the reset transistor, the first voltage repelling the charges accumulated in the charge accumulating unit; and
varying by the control unit a voltage being applied to the source from the first voltage to the second voltage while applying by the control unit the turn-on voltage to the gate, the second voltage attracting the charges accumulated in the charge accumulating unit,
wherein, while the gate of the reset transistor is on, the control circuit gradually varies the voltage being applied to the source from the first voltage to the second voltage, so that a time period for the gradual variation takes longer than or equal to a time period required for a pulse to the gate to either rise or fall.

8. A solid-state imaging device comprising:
a semiconductor substrate; and
a plurality of unit pixels disposed on the semiconductor substrate, wherein
each of the plurality of unit pixels includes:
a first electrode;
a photoelectric converting film disposed on the first electrode and converting light into an electric signal;
a second electrode disposed on the photoelectric converting film;
a charge accumulating region of first conductivity, the charge accumulating region being electrically connected to the first electrode, and the charge accumulating region accumulating charges generated by the photo-electric converting film through photo-electrical conversion;

a charge barrier region of second conductivity disposed in contact with a bottom of the charge accumulating region, the second conductivity being electrically opposite the first conductivity; and a charge draining region of the first conductivity disposed in contact with a bottom of the charge barrier region.

9. The solid-state imaging device according to claim 8, wherein the charge barrier region is lower in impurity concentration than the charge draining region.

10. The solid-state imaging device according to claim 8, further comprising a metal-oxide-semiconductor (MOS) transistor initializing a potential of the charge accumulating region, wherein the charge accumulating region also works as one of a drain region and a source region of the MOS transistor, an other one of the drain region and the source region of the MOS transistor is of the first conductivity, and from a top surface of the semiconductor substrate, the charge accumulating region is formed deeper than the other one of the drain region and the source region is.

11. The solid-state imaging device according to claim 8, wherein the charge draining region contacts the semiconductor substrate of the second conductivity.

12. The solid-state imaging device according to claim 8, wherein a potential of the charge draining region varies.

\* \* \* \* \*